United States Patent
Karlsson et al.

(10) Patent No.: US 10,270,329 B2
(45) Date of Patent: Apr. 23, 2019

(54) SWITCHED MODE POWER SUPPLY COMPENSATION LOOP

(71) Applicant: Telefonaktiebolaget LM Ericsson (publ), Stockholm (SE)

(72) Inventors: Magnus Karlsson, Oskarshamn (SE); Torbjörn Holmberg, Kalmar (SE); Andreas Larsson, Kalmar (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/744,627

(22) PCT Filed: Jul. 14, 2015

(86) PCT No.: PCT/EP2015/066052
§ 371 (c)(1),
(2) Date: Jan. 12, 2018

(87) PCT Pub. No.: WO2017/008843
PCT Pub. Date: Jan. 19, 2017

(65) Prior Publication Data
US 2018/0205308 A1    Jul. 19, 2018

(51) Int. Cl.
*H02M 1/14*    (2006.01)
*H02M 1/00*    (2006.01)
(Continued)

(52) U.S. Cl.
CPC .............. *H02M 1/14* (2013.01); *H02M 1/00* (2013.01); *H02M 1/12* (2013.01); *H02M 3/157* (2013.01);
(Continued)

(58) Field of Classification Search
CPC .. H02M 1/12; H02M 1/14; H02M 2001/0016; H02M 7/04; H02M 3/04; H02M 2001/0025
(Continued)

(56) References Cited

U.S. PATENT DOCUMENTS 7,428,159 B2 *  9/2008  Leung ............... H02M 3/33515
                                                    323/284
7,502,240 B2 *  3/2009  Leung ............... H02M 3/33515
                                                    307/40
(Continued)

FOREIGN PATENT DOCUMENTS

WO        2017008843 A1     1/2017

OTHER PUBLICATIONS

Corrandini, Luca, et al,, "Bandwidth Multisampled Digitally Controlled DC Converters Using Ripple Compensation", IEEE Transactions on Industrial Electronics, Vo. 55, No. 4, Apr. 2008, 8 pgs.
(Continued)

Primary Examiner — Rajnikant Patel
(74) Attorney, Agent, or Firm — Boisbrun Hofman, PLLC

(57) ABSTRACT

A controller includes a sampling module that samples a signal indicative of the output voltage, a filter module that filters out a ripple component of a sampled signal to generate a filtered signal, and a proportional-integral-derivative (PID) controller that generates a duty cycle control signal. The PID controller includes a first component that scales sample values of the filtered signal to generate a first component signal, a down-sampling module that generates a down-sampled signal, and a storage module that stores a value of the down-sampled signal. The PID controller also includes a second component that generates a second component signal as a product of a factor and a difference signal between each sample value in the filtered signal and stored
(Continued)

value, a third component that scales and accumulates the down-sampled signal to generate a third component signal, and a summing module that sums the first, second and third component signals.

20 Claims, 21 Drawing Sheets

(51) Int. Cl.
    *H02M 1/12*     (2006.01)
    *H02M 3/335*     (2006.01)
    *H02M 3/157*     (2006.01)

(52) U.S. Cl.
    CPC ............... *H02M 3/33507* (2013.01); *H02M 2001/0025* (2013.01)

(58) Field of Classification Search
    USPC ...... 323/281–285, 287, 299, 280; 363/21.06, 363/21.08, 21.12, 21.16
    See application file for complete search history.

(56) References Cited

U.S. PATENT DOCUMENTS

| | | | |
|---|---|---|---|
| 8,130,522 B2* | 3/2012 | Maksimovic | H02M 3/1584 363/89 |
| 8,698,469 B1* | 4/2014 | Latham, II | H02M 1/15 323/283 |
| 8,816,660 B2* | 8/2014 | Trautmann | H02M 3/158 323/282 |
| 2011/0176337 A1 | 7/2011 | Young | |
| 2013/0229197 A1 | 9/2013 | Kusaka et al. | |

OTHER PUBLICATIONS

Multirate techniques fuel advances in digital power conversion, Digital PWM Modulation, Feb. 4, 2014, Chance Dunlap, 222907570, 3 pages.

* cited by examiner

SWITCHED MODE POWER SUPPLY COMPENSATION LOOP

CROSS-REFERENCE TO RELATED APPLICATIONS

This application is the National Stage of, and therefore claims the benefit of, International Application No. PCT/EP2015/066052 filed on Jul. 14, 2015, published as International Publication No. WO 2017/008843 A1, entitled "Switched Mode Power Supply Compensation Loop". The above application is commonly assigned with this National Stage application and is incorporated herein by reference in its entirety.

TECHNICAL FIELD

The present invention generally relates to the field of switched mode power supplies (sometimes referred to as switch mode power supplies or switching mode power supplies) and more specifically to the feedback control loop of a switched mode power supply that is used to regulate the power supply's output voltage.

BACKGROUND

The switched mode power supply (SMPS) is a well-known type of power converter having a diverse range of applications by virtue of its small size and weight and high efficiency, for example in personal computers and portable electronic devices such as cell phones. A SMPS achieves these advantages by switching one or more switching elements such as power MOSFETs at a high frequency (usually tens to hundreds of kHz), with the frequency or duty cycle of the switching being adjusted by a feedback loop (also widely referred to as a "compensation loop" or "feedback circuit") to convert an input voltage to a desired output voltage. A SMPS may take the form of a rectifier (AC/DC converter), a DC/DC converter, a frequency changer (AC/AC) or an inverter (DC/AC).

The feedback loop typically comprises a controller that generates, based on the output voltage of the SMPS and in accordance with a control law defined by one or more control law parameters, a control signal for regulating the switching frequency or the switching duty cycle of the switching element(s) of the SMPS, to keep the output voltage of the SMPS in the vicinity of a predetermined value. For example, the SMPS may comprise a Proportional-Integral-Derivative (PID) controller that regulates the duty cycle (or the switching frequency, as the case may be) of the switching element(s) to keep the output voltage of the SMPS constant, in accordance with a PID control law that is characterised by the values of the P, I and D control parameters set in the PID controller.

A conventional SMPS typically makes use of a periodic reference signal and a duty cycle control signal that has been generated by its PID controller to generate drive signals for turning ON and OFF the switching element(s) in its drive train. In the so-called Nyquist-sampled controller, in which the output voltage sampling rate and the SMPS switching frequency are the same, a duty cycle control signal indicative of a duty cycle value is generated during one period of the reference signal, using a sample of the output voltage obtained during this period, and is then used to control the switching of the switching element(s) in the next period. The conventional SMPS typically uses pulse width modulation (PWM) to generate drive signals for the switching element(s), wherein the duty cycle control signal is compared with the reference signal, and the state of the switching element(s) is controlled on the basis of that comparison.

For example, the SMPS may employ a digital PWM (DPWM) to drive the switching element(s) based on a comparison between the reference signal and the duty cycle control signal generated by the PID controller. For example, where the SMPS employs dual-edge modulation, the reference signal may, as shown in FIG. 1, be provided in the form of a triangular waveform. In FIG. 1, the value, $S_1$, of the duty cycle control signal $S_D$ that is to be used in the period $P_1$ (starting at time $t=T_1$) is generated during the period $P_0$. The DPWM of the SMPS compares the duty cycle control signal $S_D$ with the reference signal, $S_{Ref}$, and generates a drive signal, $S_{Drive}$, for the switching element(s) based on that comparison. In the example of FIG. 1, the drive signal $S_{Drive}$ is high, and the switching element(s) are consequently turned ON, when $S_D$ exceeds $S_{Ref}$.

In the conventional SMPS described above, there is a delay of about one period of the reference signal between the calculation of the duty cycle control signal value and the switching of the switching element(s) in accordance with that value. This delay leads to a phase loss that reduces the performance of the SMPS, for example, in terms of load transient response.

Due to the relatively high power consumption and silicon area of fast Analog to Digital Converters (ADC) and fast digital signal processing (DSP) circuits that have been available in the past, SMPS controllers of the conventional type described above have continued to be the industry standard, despite the performance limitations outlined above. However, technological improvements in the field of CMOS processes, which allow high-speed ADC and high-speed DSP to be realised, have opened up the possibility of improving SMPS performance at an affordable cost. More particularly, the so-called multi-rate controllers that have been developed sample the feedback signal (e.g. an error signal indicative of the difference between the output voltage and a reference signal) at a frequency N times higher than the reference signal frequency, and use this oversampled signal together with one or more other signals sampled at lower frequency to switch the switching element(s) multiple times during each period of the reference signal (rather than once, as in the case of the conventional SMPS whose operation is illustrated in. FIG. 1), thereby reducing the aforementioned phase loss.

To achieve a good feedback loop response and avoid oscillations, multi-rate SMPS controllers typically employ a filtering process that attenuates the usual voltage ripple which propagates to the feedback loop from the output of the SMPS. The voltage ripple is a substantially periodic oscillation in the output voltage of the SMPS, which is typically small in relation to the output voltage of the SMPS, and which may occur as a result of an incomplete suppression of an output alternating waveform by the SMPS's output filter. Conventional digital SMPS controllers usually attenuate the ripple component by oversampling the output voltage of the SMPS (or the error signal, as the case may be) and manipulating the oversampled signal using an appropriately configured Finite Impulse Response (FIR) or Infinite Impulse Response (IIR) filter, e.g. a moving average filter or a decimation filter. Such filtering processes cause the voltage ripple component of the oversampled signal to be suppressed, thus allowing the low-bandwidth signal (i.e. voltage deviations due to transients) to be obtained for use in output voltage regulation.

SUMMARY

The present inventors have devised a multi-rate controller for generating duty cycle control signals for controlling the output voltage of an SMPS in a simple way, which naturally lends itself to gain scheduling applications, for example.

More specifically, the inventors have devised a controller arranged to generate a duty cycle control signal for controlling an output voltage of an SMPS, the SMPS being arranged to control its switching based on the duty cycle control signal and an oscillatory reference signal. The controller comprises: a sampling module arranged to sample a signal indicative of the output voltage of the SMPS at a frequency higher than a frequency of the reference signal; a filter module arranged to filter out a ripple component of the sampled signal to generate a filtered signal; and a Proportional-Integral-Derivate, PID, controller arranged to generate the duty cycle control signal based on the filtered signal. The PID controller comprises: a first component arranged to scale sample values of the filtered signal by a first scaling factor to generate a first component signal; a down-sampling module arranged to generate a down-sampled signal by sampling, at the frequency of the reference signal, a signal based on the sampled signal; a storage module arranged to store a value of the down-sampled signal; a second component arranged to generate a second component signal by calculating values of a product of a second scaling factor and a difference signal, the second component being arranged to calculate the difference signal by calculating the difference between each sample value in the filtered signal and the stored value of the down-sampled signal, the PID controller being arranged such that each value of the difference signal represents the difference between a respective value of the filtered signal that is based on a respective one or more samples obtained by the sampling module during a period of the reference signal, and a value of the down-sampled signal that is based on at least one sample obtained by the sampling module in a preceding period of the reference signal; a third component arranged to scale the down-sampled signal by a third scaling factor and accumulate values of the scaled, down-sampled signal to generate a third component signal; and a summing module arranged to generate the duty cycle control signal by summing the first, second and third component signals.

The inventors have further devised a controller arranged to generate a duty cycle control signal for controlling an output voltage of an SMPS, the SMPS being arranged to control its switching based on the duty cycle control signal and an oscillatory reference signal. The controller comprises: a sampling module arranged to sample a signal indicative of the output voltage of the SMPS at a frequency higher than a frequency of the reference signal; a filter module arranged to filter out a ripple component of the sampled signal to generate a filtered signal; and a Proportional-Integral-Derivate, PID, controller arranged to generate the duty cycle control signal based on the filtered signal. The PID controller comprises: a first component arranged to scale sample values of the filtered signal by a first scaling factor to generate a first component signal; a down-sampling module arranged to generate a down-sampled signal by sampling, at the frequency of the reference signal, a signal based on the sampled signal; a storage module arranged to store a value of the down-sampled signal; a second component arranged to generate a second component signal by calculating values of a product of a second scaling factor and the stored value of the down-sampled signal; a third component arranged to scale the down-sampled signal by a third scaling factor and accumulate values of the scaled, down-sampled signal to generate a third component signal; and a combining module arranged to generate the duty cycle control signal by calculating the difference between the second component signal and a sum of the first and third component signals, the PID controller being arranged such that each calculated value of the difference represents the difference between: (i) the sum of a respective value of the first component signal that is based on a respective one or more samples obtained by the sampling module (150) during a period of the reference signal, and respective value of the third component signal that is based on accumulated values of the scaled, down-sampled signal that have been obtained by the down-sampling module in preceding periods of the reference signal; and (ii) a value of the second component signal that is based on at least one sample obtained by the sampling module in a preceding period of the reference signal.

The inventors have further devised a switched mode power supply comprising a controller as set out above.

The inventors have further devised a method of generating a duty cycle control signal for controlling an output voltage of an SMPS, the SMPS being arranged to control its switching based on the duty cycle control signal and an oscillatory reference signal. The method comprises: sampling a signal indicative of the output voltage of the SMPS at a frequency higher than a frequency of the reference signal; filtering out a ripple component of the sampled signal to generate a filtered signal; and generating the duty cycle control signal based on the filtered signal. The duty cycle control signal is generated by: scaling sample values of the filtered signal by a first scaling factor to generate a first component signal; generating a down-sampled signal by sampling, at the frequency of the reference signal, a signal based on the sampled signal; storing a value of the down-sampled signal; generating a second component signal by calculating values of a product of a second scaling factor and a difference signal, the difference signal being calculated as the difference between each sample value in the filtered signal and the stored value of the down-sampled signal, wherein each value of the difference signal represents the difference between a respective value of the filtered signal that is based on a respective one or more samples obtained during a period of the reference signal, and a value of the down-sampled signal that is based on at least one sample obtained in a preceding period of the reference signal; scaling the down-sampled signal by a third scaling factor and accumulating values of the scaled, down-sampled signal to generate a third component signal; and generating the duty cycle control signal ($S_D$) by summing the first, second and third component signals.

The inventors have further devised a method of generating a duty cycle control signal for controlling an output voltage of an SMPS, the SMPS being arranged to control its switching based on the duty cycle control signal and an oscillatory reference signal. The method comprises: sampling a signal indicative of the output voltage of the SMPS at a frequency higher than a frequency of the reference signal; filtering out a ripple component of the sampled signal to generate a filtered signal; and generating the duty cycle control signal based on the filtered signal. The duty cycle control signal is generated by: scaling sample values of the filtered signal by a first scaling factor to generate a first component signal; generating a down-sampled signal by sampling, at the frequency of the reference signal, a signal based on the sampled signal; storing a value of the down-sampled signal; generating a second component signal by calculating values of a product of a second scaling factor and the stored value of the down-sampled signal; scaling the down-sampled signal by a third scaling factor and accumulating values of the scaled, down-sampled signal to generate a third component signal; and generating the duty cycle control signal by calculating the difference between the second component signal and a sum of the first and third component signals, wherein each calculated value of the difference represents the difference between: (i) the sum of a respective value of the first component signal that is based on a respective one or more samples obtained during a period of the reference signal, and respective value of the third component signal that is based on accumulated values of the scaled, down-sampled signal that have been obtained in preceding periods of the reference signal; and (ii) a value of the second component signal that is based on at least one sample obtained in a preceding period of the reference signal.

The inventors have further devised a computer program product, comprising a signal or a non-transitory computer-readable storage medium carrying computer program instructions which, when executed by a processor, cause the processor to perform a method as set out above.

BRIEF DESCRIPTION OF THE DRAWINGS

Embodiments of the invention will now be explained in detail, by way of example only, with reference to the accompanying figures, in which.

DETAILED DESCRIPTION OF EMBODIMENTS

Embodiment 1

Figure 1:
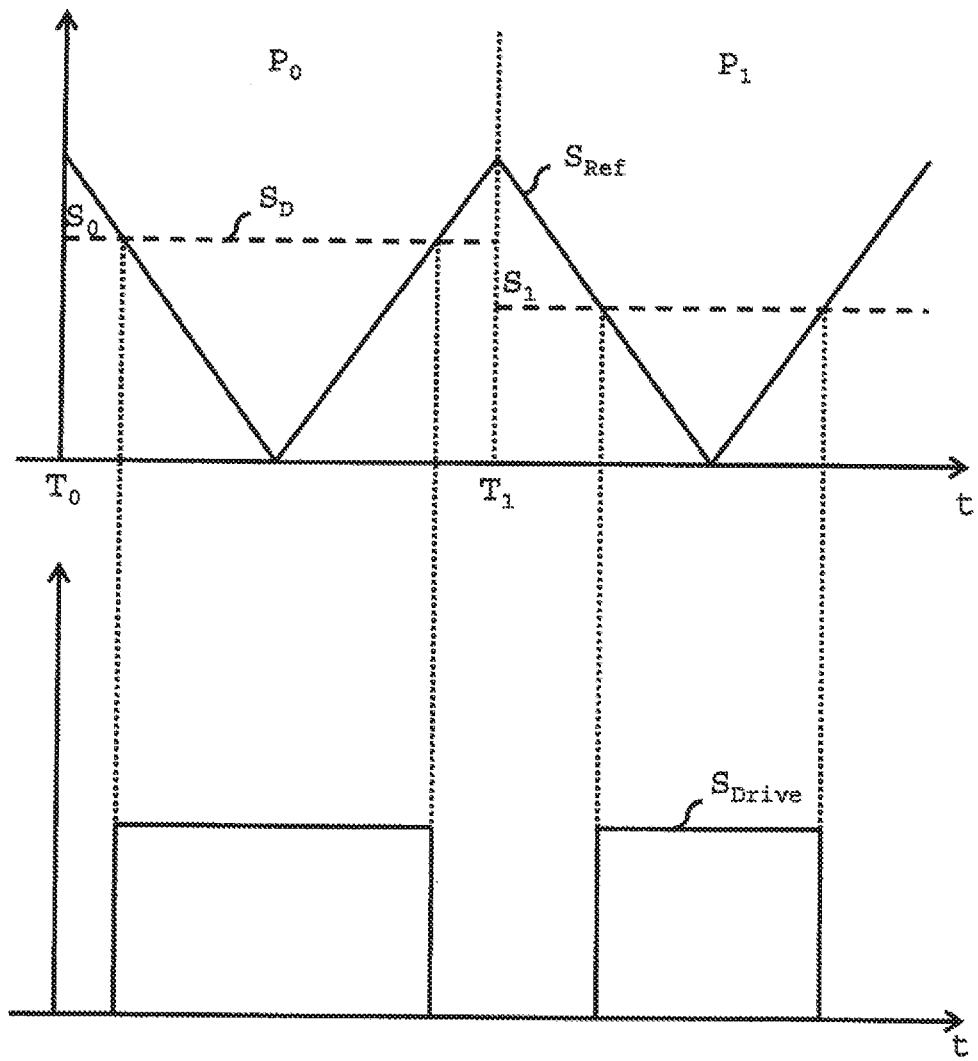
FIG. 1 illustrates signals used by the DPWM of a conventional SMPS to control the switching of the SMPS.
Figure 2:
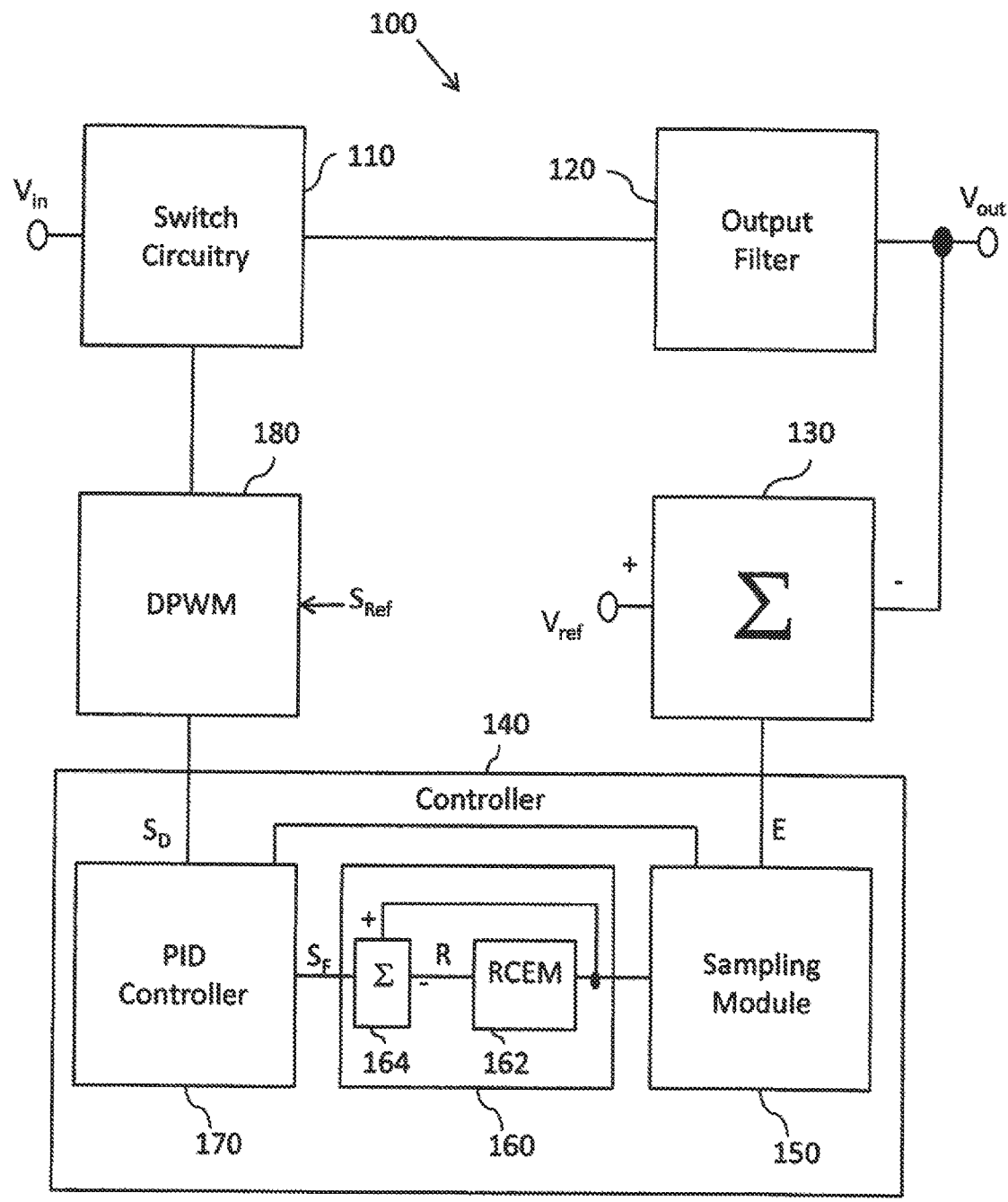
FIG. 2 illustrates functional components of a switched mode power supply according to a first embodiment of the present invention.

FIG. 2 is a schematic showing an SMPS 100 according to an embodiment of the present invention.

In the present embodiment, the SMPS 100 comprises switch circuitry 110 having at least one switching element (e.g. MOSFET) that is arranged in the switch circuitry 110 and controlled to switch at a high frequency (e.g. tens to hundreds of kHz) and with a duty cycle so as to convert an input DC voltage $V_{in}$ of the SMPS 100 to an output voltage, which is filtered by a low-pass filter 120 of the SMPS (e.g. a first order LC filter comprising an inductor and one or more capacitors) to generate an output a DC voltage, $V_{out}$, of the SMPS 100. The switch circuitry 110 may, as in the present embodiment, include an isolation transformer having a primary winding driven by a primary side circuit, and a secondary winding electromagnetically coupled to the primary winding and arranged to drive a secondary side circuit typically comprising a rectifying network, the one or more switching elements being provided in one or both of the primary and secondary side circuits. Suitable circuit topologies (e.g. buck, boost, isolated or not) and other details of the switch circuitry 110 (e.g. whether it is configured to be soft-switched or hard-switched), as well as details of the output filter 120, are well-known to those skilled in the art and will therefore not be described here.

The SMPS 100 further comprises a feedback loop which is arranged to regulate the output voltage $V_{out}$ of the SMPS 100 in accordance with a control law that is characterised by a set of Proportional, Integral and Derivative values (hereafter abbreviated to P, I and D values, respectively). The feedback loop operates on the basis of a signal that is indicative of the output voltage $V_{out}$ of the SMPS. This signal may, for example, be the output voltage $V_{out}$ itself or an error signal E obtained by subtracting one of $V_{out}$ and a reference voltage $V_{ref}$ from the other of $V_{out}$ and $V_{ref}$. In the present embodiment, the feedback loop comprises a subtraction module 130 that is configured to subtract $V_{out}$ from $V_{ref}$, and communicate the resulting error signal E to the SMPS controller 140 as an example of a signal that is indicative of $V_{out}$.

The SMPS controller 140 comprises a sampling module 150 that is arranged to sample the error signal E at a frequency higher than a frequency of an oscillatory reference signal, $S_{Ref}$, which is used by the SMPS 100 to control its switching, and to temporarily store the sampled values. The sampling module 150 may, as in the present embodiment, oversample the error signal E by an integer factor N=16. Naturally, the oversampling factor N is not limited to 16 and may take any other integer value selected by the user. In embodiments where N is an integer and the operation of the sampling module 150 is synchronised with the reference signal $S_{Ref}$, N samples of the error signal E are obtained in each period T of the reference signal $S_{Ref}$, with the i$^{th}$ sample in each period being spaced apart from the i$^{th}$ sample in the next (or previous) period by the period T of the reference signal $S_{Ref}$, and with each of these samples having been obtained at the same time relative to the start of the respective period. Thus, the sampling module 150 can be considered to sample and hold N sets of corresponding samples of the error signal E, with the sample acquisition times of the samples in each set being spaced apart from one another by the period T. The number of samples in each of these sets may also be selected by the user, and can be considered to define a (moving) time window within which corresponding samples are averaged, as explained further below.

To achieve a good feedback loop response and avoid oscillations, the controller 140 also includes a filter module, which is arranged to at least partially remove the usual voltage ripple that propagates to the feedback loop from the output of the SMPS, specifically to filter out at least one ripple component of the sampled signal to generate a filtered signal $S_F$.

The filter module may attenuate the ripple by oversampling the error signal E and manipulating the oversampled signal using an appropriately configured Finite Impulse Response (FIR) or Infinite Impulse Response (IIR) filter, e.g. a moving average filter or a decimation filter. Such filtering processes cause the voltage ripple in the oversampled signal to be suppressed, thus allowing the remaining signal (i.e. voltage deviations due to transients) to be obtained for use in output voltage regulation.

The present inventors have recognised that the filter designs mentioned above have the disadvantage of introducing a delay in the signal, which degrades the performance of the feedback loop. More particularly, these filter designs introduce a phase lag and distort the shape of the signal in the time domain, making real-time control of the SMPS's output voltage difficult or impossible.

Figure 3:
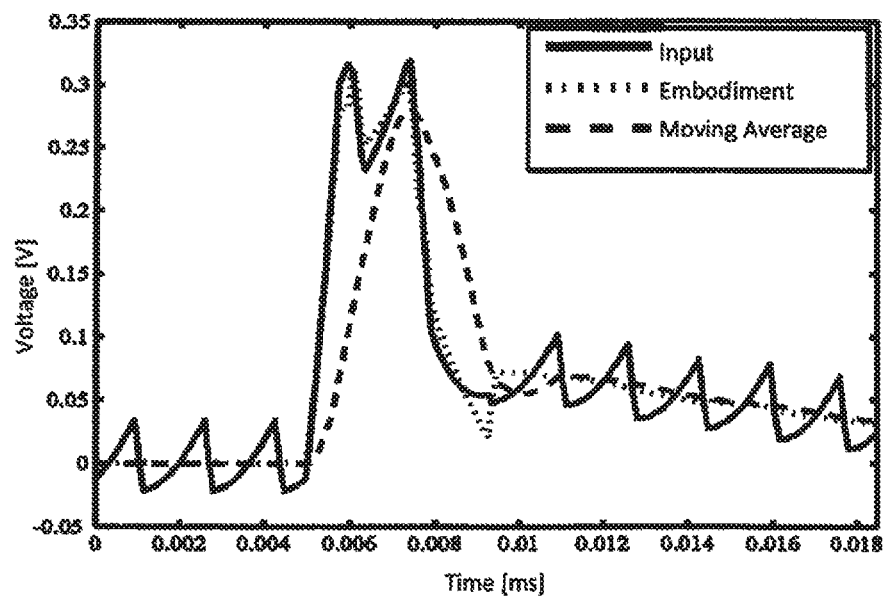
FIG. 3 shows measurements of a feedback error signal (solid line) during a period of time in which a voltage transient is observed, together with measurements of the output of a conventional moving average filter (dashed line), and of the output of a filter module (dotted line) of the first embodiment.

As an example, FIG. 3 shows the output of a conventional moving average filter (dashed line) that is arranged to filter the error signal E (solid line). In this example, the moving average filter operates over 16 samples, which is the same as the number of samples in the period of the reference signal $S_{Ref}$ (an oversampling ratio of 16 is used). As can be appreciated from FIG. 3, although the moving average filter is effective in suppressing the ripple, it causes the signal to be delayed and distorted during a transient event (beginning at time t=0.005 ms).

Having recognised these drawbacks, the present inventors have devised a scheme for filtering the feedback signal which exploits the reproducibility (or near-reproducibility) of the ripple over a number of periods of the reference signal $S_{Ref}$ during stable operation of the SMPS to obtain a good estimate of the prevailing ripple component. This estimate of the ripple component is subtracted from the feedback signal (e.g. the output voltage of the SMPS or the aforementioned error signal E) to yield the remaining signal, which exhibits little or no delay or distortion. The ability of an embodiment of the present invention to effectively suppress the ripple component whilst leaving the remainder of the feedback signal substantially unchanged is illustrated by the dotted line in FIG. 3. The delay/distortion is considerably smaller than in the case where a conventional moving average filter is used.

More specifically, in an embodiment of the present invention, the filter module 160 may comprise a ripple component estimation module that is arranged to estimate the ripple component. R by calculating, for each or some of the samples of the signal that have been received from the sampling module 150, an average sample value (e.g. a mean or a weighted average) using the sample value itself and sample values obtained at corresponding points in preceding periods of the reference signal. $S_{Ref}$, each of said corresponding points being separated from the sample by a respective integer number of periods of the reference signal. The corresponding points may alternatively be separated from said sample by a respective interval whose length is substantially equal to (i.e. within a tolerance band, such as 2%, 5% or 10%, of) said respective integer number of periods. In the present embodiment, the ripple component estimation module 162 is arranged to calculate a weighted average of the sample values (including the sample value itself) in the time window for each of the aforementioned N sets of samples. In this way, the ripple component estimation module 162 is able to obtain a good estimate of what the ripple component R should be at any point in time, by exploiting the reproducibility of the ripple from one period of the reference signal to the next during stable operation of the SMPS 100 (when no transients appear). The averaging process suppresses the influence of outlying sample values on the mean sample value, thereby allowing the ripple component R to be estimated with relatively high accuracy.

Figure 4:
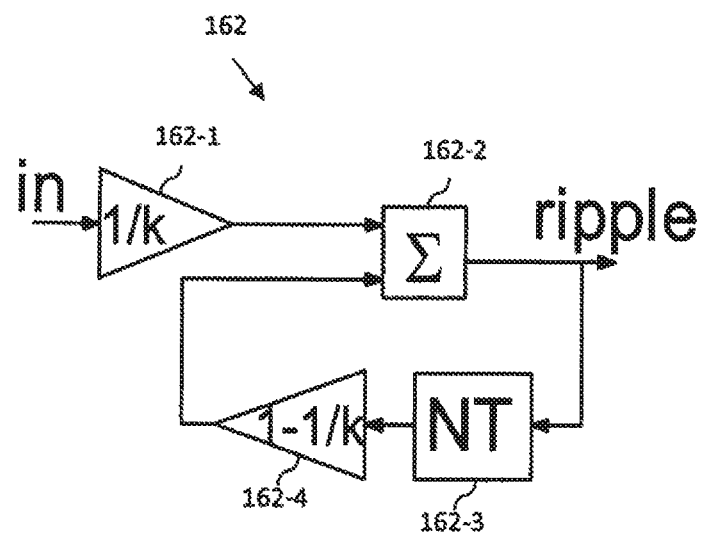
FIG. 4 shows an example implementation of the ripple component estimation module illustrated in FIG. 2.

In the present embodiment, the ripple component estimation module 162 is arranged to estimate the ripple component R using an interpolated low-pass filter in the exemplary form of a first-order interpolated recursive moving average filter, as illustrated in FIG. 4. The factor k shown in FIG. 4 is approximately equal to the number of periods of the reference signal $S_{Ref}$ which are considered in the calculation of the average.

The interpolated recursive moving average filter in the example of FIG. 4 comprises a first scaling module 162-1 arranged to receive sample values of the sampled signal and scale each of the received sample values by a factor 1/k, and a summing module 162-2 arranged to add each of the scaled sample values to a respective sum of scaled sample values to generate a respective addition result. As shown in FIG. 4, the interpolated recursive moving average filter further comprises a feedback loop that processes the output of the summing module 162-2 and feeds the processing results back to an input of the summing module 162-2. In more detail, the feedback loop comprises a delay module 162-3 (e.g. in the form of a First In, First Out (FIFO) buffer) which is arranged to receive the addition results in the order in which the addition results are generated by the summing module 162-2, to store N of the received addition results at any one time, and to output a stored addition result in response to an addition result being received by the delay module 162-3 so that the stored addition results are output in the same order as they were received by the delay module 162-3. The feedback loop also includes a second scaling module 162-4, which is arranged to receive the addition results from the delay module 162-3 in the order in which they are output by the delay module 162-3, and to scale each received addition result by a factor 1-1/k in order to generate the respective sum of scaled sample values that is to be added to the respective scaled sample value by the summing module 162-2.

The transfer function from the input, in(z), to the output of the filter in FIG. 4, ripple(z), is given by $$ripple(z) = \frac{1/k}{1-(1-1/k)z^{-N}} in(z).\qquad \text{Eqn. 1}$$

Referring again to FIG. 2, the filter module 160 also includes a subtraction module 164 arranged to subtract the estimated ripple component R from the sampled signal to generate a filtered signal $S_F$, and a PID controller 170, which is arranged to generate a duty cycle control signal $S_D$ for controlling the switching duty cycle of the SMPS 100 based on the filtered signal $S_F$.

Using Eqn. 1, the transfer function for the $S_F(z)$ signal in FIG. 2 can be expressed as follows:

$$S_F(z) = 1 - ripple(z) = \left[1 - \frac{1/k}{1-(1-1/k)z^{-N}}\right]in(z) = \qquad \text{Eqn. 2}$$
$$\frac{(1-1/k)[1-z^{-N}]}{1-(1-1/k)z^{-N}} in(z)$$

Equation 2 can be used as a variant for calculating the transient signal. However, this variant would require twice the memory, and the ripple component would not be calculated explicitly.

In other embodiments, the ripple component estimation module 162 may be arranged to estimate the ripple component R using a first-order interpolated low-pass filter in the alternative form of an interpolated Finite Impulse Response (FIR) filter (e.g. an interpolated moving average filter). Higher-order interpolated low-pass filters may alternatively be used, as will be discussed in the following.

The PID controller 170 (also referred to as a PID regulator) regulates the duty cycle of the switching element(s) in the switch circuitry 110 to keep the output voltage of the SMPS 100 substantially constant, on the basis of the filtered signal $S_F$ from the filter module 160 and in accordance with a PID control law that is characterised by the values of the P, I and D control parameters set in the PID controller 170. The PID controller 170 is arranged to generate the duty cycle control signal $S_D$ (indicative of the required switching duty cycle) to control a digital pulse width modulator (DPWM) 180, which is also included in the feedback loop, in order to appropriately control the switching of the switching element (s). The DPWM 180 controls the switching of the switching element(s) in the switch circuitry 110 based on the duty cycle control signal $S_D$ and the aforementioned oscillatory reference signal, $S_{Ref}$. The DPWM 180 can be of any suitable type and use any suitable form of modulation, e.g. leading-edge, trailing-edge or dual-edge modulation. Of these alternatives, dual-edge modulation yields the best result as it gives the least phase delay, and is therefore employed in the present embodiment.

Figure 5:
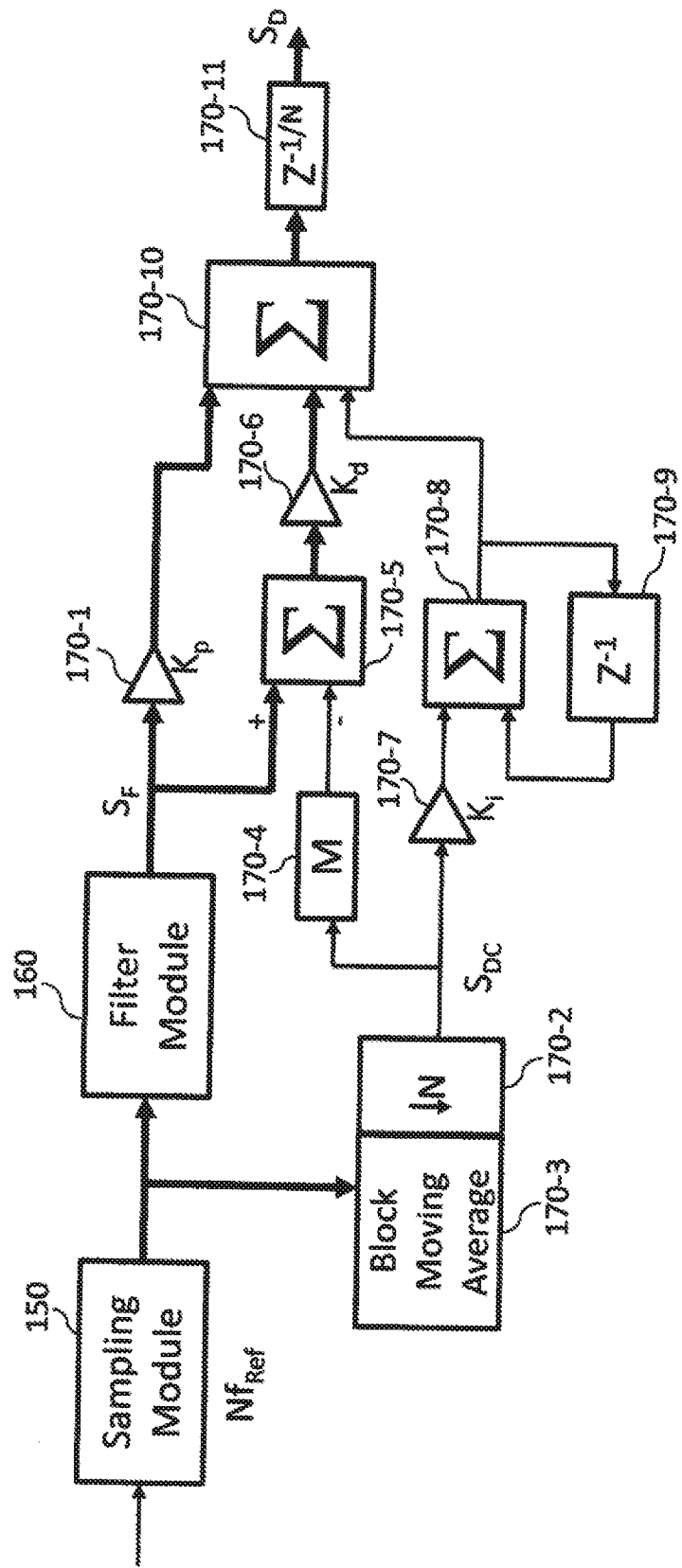
FIG. 5 is a schematic showing further details of the controller 140 of the first embodiment.

FIG. 5 shows the configuration of the PID controller 170 of the present embodiment, together with the sampling module 150 and filter module 160. As shown in FIG. 5, the PID controller 170 of the present embodiment comprises three components, in other words, three signal processing "branches"; namely, a first component (also referred to herein as a "Proportional component", which can be identified with the proportional (P) part of the PID controller), a second component (also referred to herein as a "Derivative component", which can be identified with the derivative (D) part of the PID controller) and a third component (also referred to herein as a "Integral component", which can be identified with the integral (I) part of the PID controller).

The Proportional component is arranged to scale sample values of the filtered signal $S_F$ output by the filter module 160 by a first scaling factor, $K_p$, to generate a first component signal (also referred to herein as a "Proportional component signal"). The first component may, as in the present embodiment, comprise a scaling module 170-1 that is arranged to scale the filtered signal $S_F$ by the factor $K_p$.

The PID controller 170 also has a down-sampling (or "decimation") module 170-2 which is arranged to generate a down-sampled signal $S_{DC}$ by sampling, at the frequency $f_{Ref}$ of the reference signal $S_{Ref}$, a signal which is based on the signal from the sampling module 150. The signal sampled by the down-sampling module 170-2 may be the signal as output by the sampling module 150 or, as in the present embodiment, a signal obtained by processing the signal output of the sampling module 150 by a block moving average filter 170-3. The block moving average filter 170-3 is arranged to calculate a respective average of samples obtained by the sampling module 150 in each period T of the reference signal $S_{Ref}$. The down-sampling module 170-2 is arranged to generate the down-sampled signal $S_{DC}$ by sampling, at the frequency $f_{Ref}$ of the reference signal, the moving average calculated by the moving average filter 170-3. In the present embodiment, the block moving average filter 170-3 is provided because the filter module 160 of the present embodiment does not correctly calculate the DC-level within each period of the reference signal $S_{Ref}$. The block moving average filter 170-3 computes the DC-level separately, by calculating the average of the N samples within each period. Hence, the result from that block has a correct result of the DC level every N samples, and this is why the down-sampling module 170-2 with a factor N is connected adjacent to it.

Figure 6:
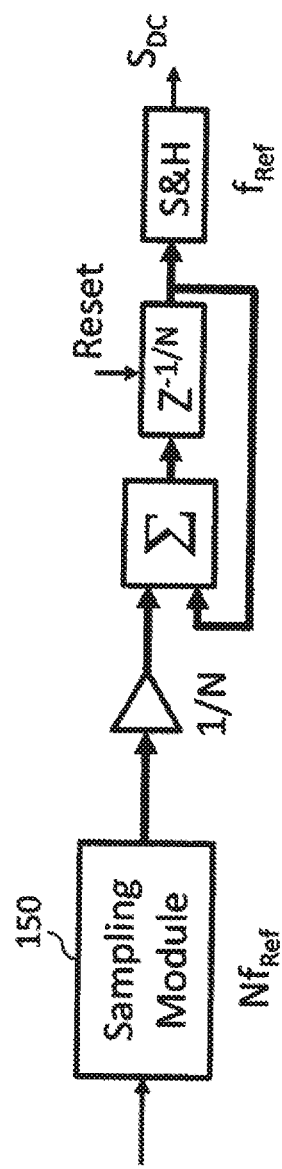
FIG. 6 shows an example implementation of the block moving average filter 170-3 and down-sampling module 170-2 illustrated in FIG. 5.

A simple implementation of a block moving average calculation and down-sampling process is illustrated in FIG. 6. The error signal E oversampled by a factor of N is multiplied by a factor 1/N. If N is chosen as a power of 2, the multiplication is easily accomplished by a shift of $log_2(N)$ bits. The multiplied values are accumulated in the accumulator $(z^{-1/N})$. At the start of each new block, the accumulator value is sampled and held at the output for the next period T and, at the same time, the accumulator register is reset. The next block can then start to be calculated. Hence, one output sample is calculated in each period of the reference signal $S_{Ref}$.

Referring again to FIG. 5, the PID controller 170 further comprises a storage module 170-4, which is arranged to store a value of the down-sampled signal output by the down-sampling module 170-2. Thus, the combination of the block moving average 170-3 and the down-sampling module 170-2 outputs, once every period of the reference signal $S_F$, an average value of the samples obtained by the sampling module 150 in the preceding period, and this value is stored in the storage module 170-4, in place of the value previously stored in the storage module 170-4.

The Derivative component of the PID controller 170 is arranged to generate a Derivative component signal by calculating values of a product of a second scaling factor, $K_d$, and a difference signal, the Derivative component being arranged to calculate the difference signal by calculating the difference between each sample value of the filtered signal $S_F$ and the value of the down-sampled signal $S_{DC}$ stored in the storage module 170-4. The PID controller 170 is arranged such that each value of the difference signal represents the difference between a respective value of the filtered signal $S_F$ (that is itself based on a respective one or more samples obtained by the sampling module 150 during a period of the reference signal $S_{Ref}$) and a value of the down-sampled signal $S_{DC}$ that is based on at least one sample obtained by the sampling module 150 in the previous period of the reference signal $S_{Ref}$.

The Derivative component may, as in the present embodiment, comprise a difference calculating module 170-5 that is arranged to calculate, for each sample of the filtered signal $S_F$ that is derived from a sample obtained by the sampling module 150 during a period of the reference signal $S_{Ref}$, the difference between that sample value and the value stored in the storage module 170-4, the stored value being based on samples obtained by the sampling module 150 in the previous period of the reference signal $S_{Ref}$. The output of the difference calculating module 170-5 is scaled by a second scaling module 170-6, specifically by the second scaling factor, $K_d$. It will be appreciated that the scaling by the factor $K_d$ may alternatively be applied to the inputs of the difference calculating module 170-5, rather than to the difference signal which it generates.

The Integral component of the PID controller 170 is arranged to scale the down-sampled signal $S_{DC}$ by a third scaling factor, $K_i$, and to accumulate values of the scaled, down-sampled signal to generate an Integral component signal. The Integral component may, as in the present embodiment, comprise a scaling module 170-7 for scaling the values of $S_{DC}$ by $K_i$, and a summing module 170-8 aged to add each of the values of the scaled, down-sampled al to a respective sum of values of the scaled, down-sampled signal to generate a respective addition result. As shown in FIG. 5, the Integral component further comprises a feedback loop that processes the output of the summing module 170-8 and feeds the processing results back to an input of the summing module 170-8. In more detail, the feedback loop comprises a delay module 170-9 (e.g. in the form of a First In, First Out (FIFO) buffer) which is arranged to receive the addition results in the order in which the addition results are generated by the summing module 170-8, to store one received addition result at any one time, and to output a stored addition result in response to an addition result being received by the delay module 170-9 so that the stored addition results are output in the same order as they were received by the delay module 170-9. In steady state, the accumulated value in the delay module 170-9 will be equal to the duty cycle. It will be appreciated that the scaling by the factor $K_i$ may alternatively be applied at the output of (instead of before) the feedback loop, at a point in the signal processing path between the feedback loop and the summing module 170-10.

As shown in FIG. 5, the PID controller 170 further comprises a summing module 170-10 arranged to generate the duty cycle control signal $S_D$ by summing the Proportional, Derivative and Integral component signals. In embodiments like the present, where the delay introduced by the signal processing operations that are performed by the PID controller 170 is small, the sum calculated by the summing module 170-10 may be stored in a delay module 170-11 which is similar to the delay module 170-9 but provides a delay of $1/Nf_{Ref}$ (rather than $T=1/f_{Ref}$ as in the case of delay module 170-9). This contrasts with conventional Nyquist-sampled PID controllers, in which the calculated value that is indicative of the required switching duty cycle is stored for a period T before being used by the DPWM to adjust the duty cycle.

It will be appreciated from the foregoing that the PID controller 170 of the present embodiment is a multi-rate controller having slow and fast signal processing paths. More particularly, the error signal E is sampled N times faster than $f_{Ref}$, and the PID controller 170 has a fast signal processing path (illustrated by the thicker lines in FIG. 5) for the P- and D-part calculations, which updates the duty cycle output N times within each period of the reference signal $S_{Ref}$, and a slow signal processing path (illustrated by the thinner lines in FIG. 5), corresponding to the Integral component which updates the value that is input to the difference calculating module 170-5 and to the summing module 170-10 once every period of the reference signal $S_{Ref}$.

The parallel form of the PID controller 170 of the present embodiment allows one or two signal processing paths to be effectively disabled by appropriate choice of P, I and D values, enabling the controller 170 to be easily configured to function not only as a PID controller but alternatively as a P controller or PD controller. For example, a PD controller with a constant offset (from the integrator) can be obtained by setting $K_i=0$. In this case, a higher gain can be used since the phase lag from the integrator component is not present. This adjustability could be exploited in gain scheduling. For example, in response to a transient, the integrator path could be turned off and the transient handled by a fast PD controller. After the transient has passed, the integrator could be turned back ON to remove the remaining steady-state error. As another example, in a noisy environment, the derivative component could be turned OFF to provide a PI regulator having a low gain at high frequencies.

Figure 7:
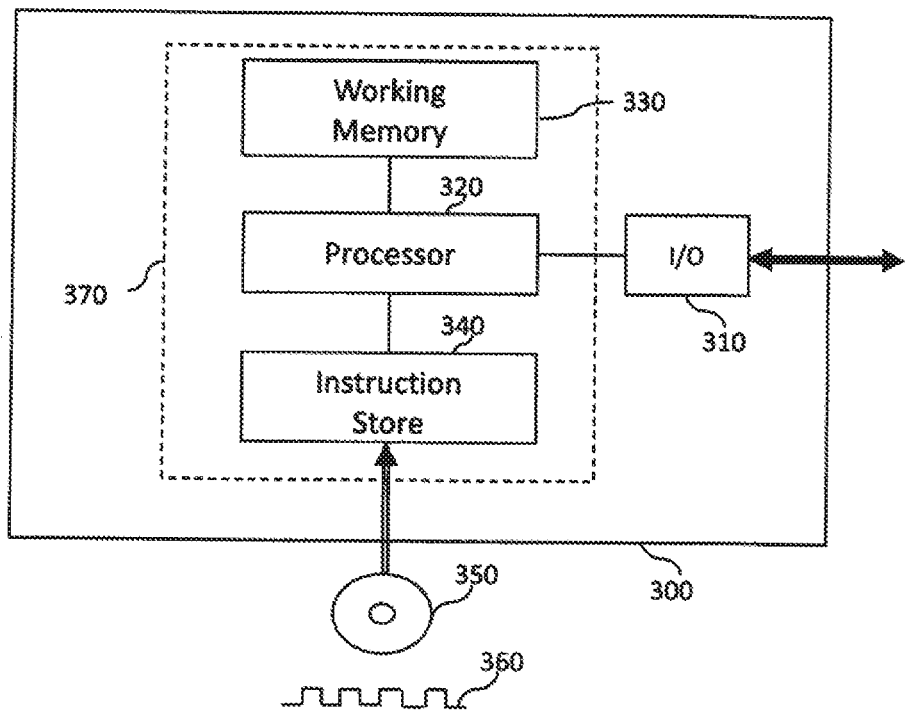
FIG. 7 shows an exemplary hardware implementation of the controller shown in FIG. 2.

FIG. 7 shows an exemplary implementation of the controller 140, in programmable signal processing hardware. The signal processing apparatus 300 shown in FIG. 7 comprises an input/output (I/O) section 310 for receiving the error signal E and transmitting control signals $S_D$ to the DPWM 180. The signal processing apparatus 300 further comprises a processor 320, a working memory 330 and an instruction store 340 storing computer-readable instructions which, when executed by the processor 320, cause the processor 320 to perform the processing operations hereinafter described to control the output voltage of the SMPS 100. The instruction store 340 may comprise a ROM which is pre-loaded with the computer-readable instructions. Alternatively, the instruction store 340 may comprise a RAM or similar type of memory, and the computer readable instructions can be input thereto from a computer program product, such as a computer-readable storage medium 350 such as a CD-ROM, etc. or a computer-readable signal 360 carrying the computer-readable instructions.

In the present embodiment, the combination 370 of the hardware components shown in FIG. 7, comprising the processor 320, the working memory 330 and the instruction store 340, is configured to implement the functionality of the aforementioned sampling module 150, filter module 160 (including the ripple component estimation module 162 and the subtraction module 164) and PID controller 170, which will now be described in detail with reference to FIG. 8.

Figure 8:
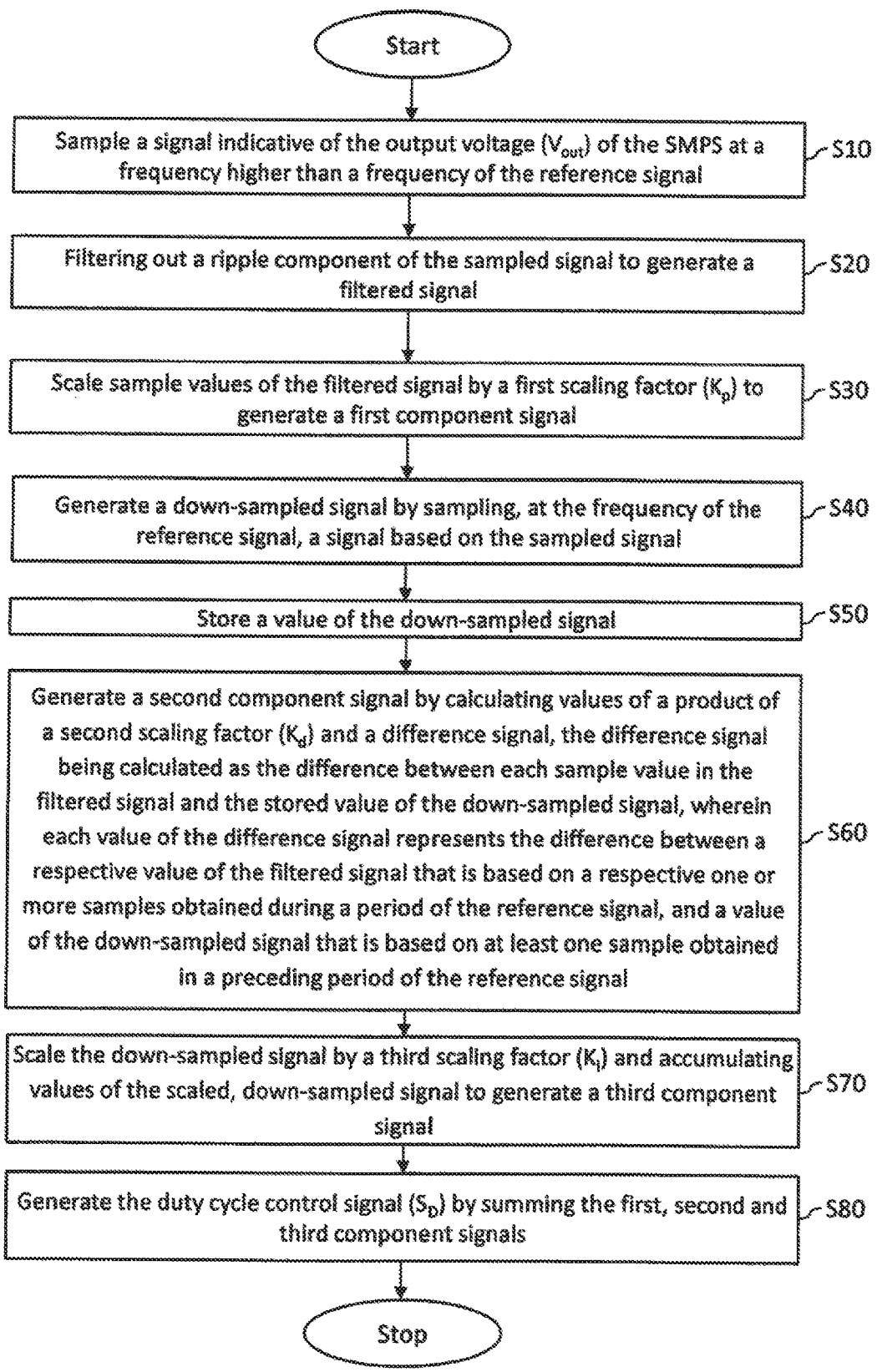
FIG. 8 is a flow diagram illustrating operations performed by the controller in the first embodiment to generate control signals for controlling the output voltage of the SMPS.

FIG. 8 is a flow chart illustrating operations performed by the controller 140 in the first embodiment to generate the duty cycle control signal $S_D$.

In step S10, the sampling module 150 samples the error signal E (as an example of a signal indicative of the output voltage of the SMPS 100) at a frequency higher than the frequency of the reference signal, $S_{Ref}$. The error signal E may, as in the present embodiment, be sampled at a frequency that is an integer multiple of the frequency, $f_{Ref}$, of the reference signal $S_{Ref}$.

In step S20, the filter module 160 filters out a ripple component of the sampled signal to generate the filtered signal, $S_F$. In the present embodiment, where the filter module 160 is configured as shown in FIG. 2, the ripple component estimation module 162 thereof estimates in step S20 the ripple component R by calculating, for each or some of the samples of the signal, an average sample value using the sample value and sample values obtained at corresponding points in preceding periods of $S_{Ref}$, the sample at each of said corresponding points being separated from the latest sample under consideration by a respective integer number of periods of the reference signal $S_{Ref}$. More particularly, in the present embodiment, the ripple component estimation module 162 calculates a weighted average of the sample values including the sample value, in the time window for each of the aforementioned N sets of samples. As explained above, the ripple component estimation module 162 estimates the ripple component R using an interpolated low-pass filter in the exemplary form of a first-order interpolated recursive moving average filter, as illustrated in FIG. 4. As noted above, the ripple component estimation module 162 may alternatively estimate the ripple component R in step S20 using a first-order interpolated low-pass filter in the form of an interpolated FIR filter (e.g. an interpolated moving average filter). As a further alternative, higher-order interpolated low-pass filters may be used. The subtraction module 164 then subtracts the estimated ripple component R from the sampled signal to generate a filtered signal, $S_F$.

Next, the duty cycle control signal $S_D$ is generated based on $S_F$.

In more detail, in Step S30, the above-described first component (specifically, the scaling module 170-1) scales sample values of the filtered signal $S_F$ by a first scaling factor $K_p$ to generate a first component signal.

In step S40, the down-sampling module 170-2 generates a down-sampled signal $S_{DC}$ by sampling, at the frequency $f_{Ref}$ of the reference signal $S_{Ref}$, a signal based on the sampled signal. Step S40 may, as in the present embodiment, comprise the block moving average filter 170-3 calculating a respective average of samples obtained in each period of $S_{Ref}$, and the down-sampling module 170-2 generating the down-sampled signal $S_{DC}$ by sampling the calculated average at the frequency $f_{Ref}$ of the reference signal $S_{Ref}$. A value of the down-sampled signal is then stored in the storage module 170-4, in step S50.

In step S60, the above-described second component of the PID controller 170 generates the second component signal by calculating values of a product of the second scaling factor $K_d$ and the difference signal, i.e. the difference between each sample value in the filtered signal and the stored value of the down-sampled signal, wherein each value of the difference signal represents the difference between a respective value of the filtered signal that is based on a respective one or more samples obtained during a period of the reference signal, and a value of the down-sampled signal that is based on at least one sample obtained in the previous period of the reference signal. Where the second component comprises a difference calculating module 170-5 and a second scaling module 170-6, as in the present embodiment, the aforementioned product is calculated by the difference calculating module 170-5 calculating the difference between a value of $S_F$ and the value stored in the storage module 170-4, and the second scaling module 170-6 scaling the result by the factor $K_d$.

In step S70, the third component scales the down-sampled signal $S_{DC}$ by a third scaling factor $K_i$, and accumulates values of the scaled, down-sampled signal to generate a third component signal. Where the third component is implemented in the form of a circuit as shown in FIG. 5, as in the present embodiment, the third scaling module 170-7 scales the down-sampled signal $S_{DC}$ by the factor $K_i$, and the summing module 170-8 and delay module 170-9 accumulate values of the scaled, down-sampled signal to generate the third component signal.

Finally, in step S80, the summing module 170-10 generates the duty cycle control signal $S_D$ by summing the first, second and third component signals.

Figure 9A:
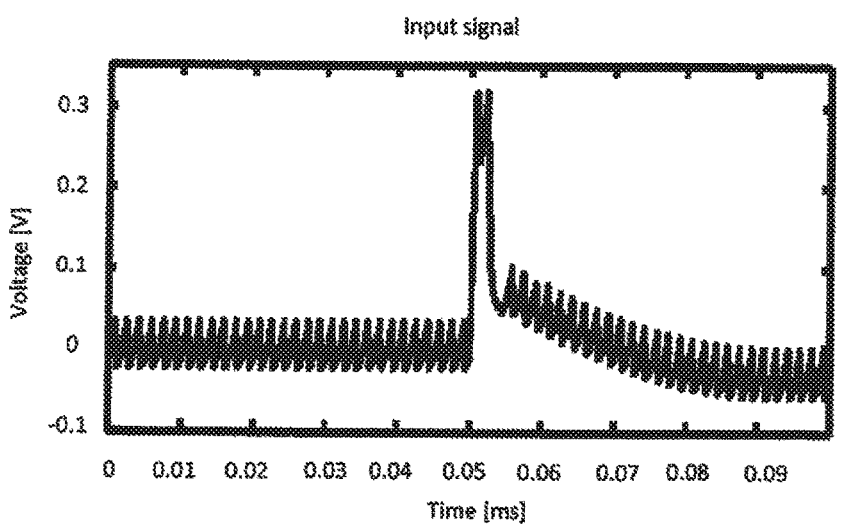
FIGS. 9A to 9C show simulations of the input signal, the estimated ripple component and the transient with attenuated ripple in the first embodiment.
Figure 9B:
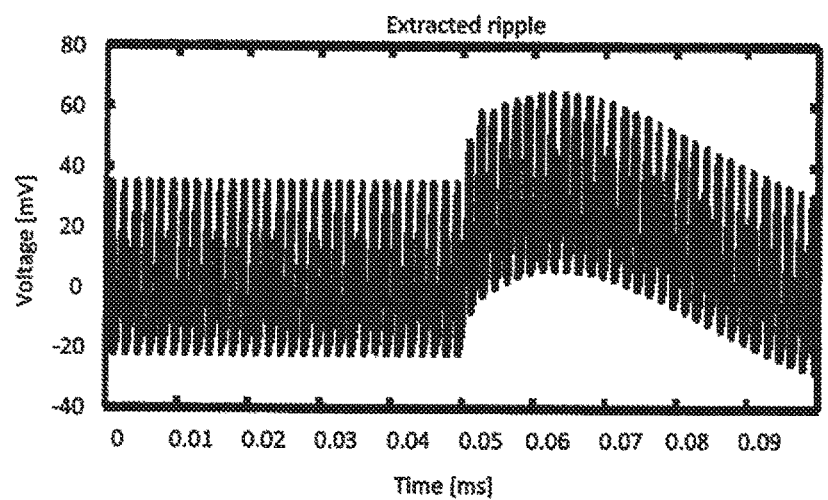
Figure 9C:
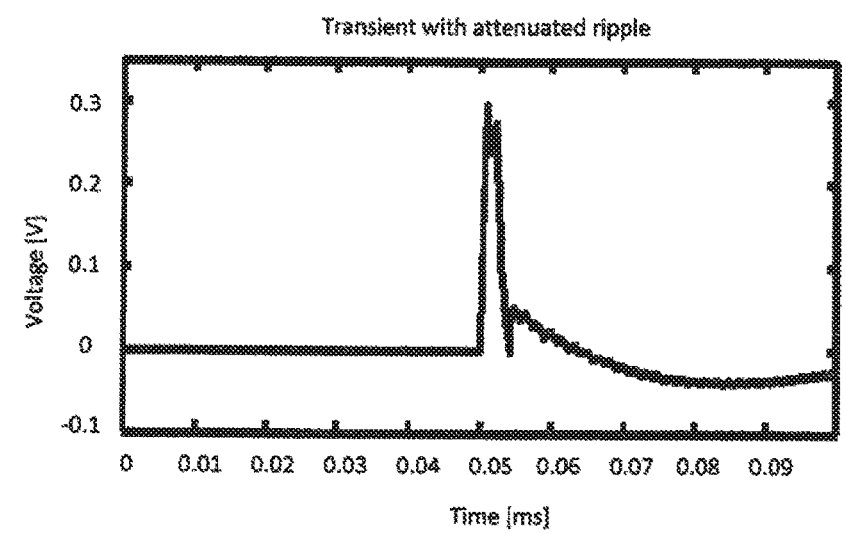

The ability of the filter module 160 of the present embodiment to effectively suppress the ripple component without significantly delaying or distorting the underlying feedback signal is illustrated in the simulation results in FIGS. 9A to 9C. FIG. 9A shows a simulation of the feedback signal input to the filter module 160 over a period of 0.1 ms, FIG. 9B shows the ripple component estimated by the ripple component estimation module 162 during that period, and FIG. 9C shows the simulated output of the filter module 160. In this example, the factor k (see FIG. 4 and the accompanying description thereof above) is set to 19. As shown in FIG. 9C, a good, essentially ripple-free transient signal is obtained. However, in the ripple trace in FIG. 9B, the voltage transient is readily apparent, with the peak of the transient appearing about 20 mV above the ripple's peak value.

Figure 10A:
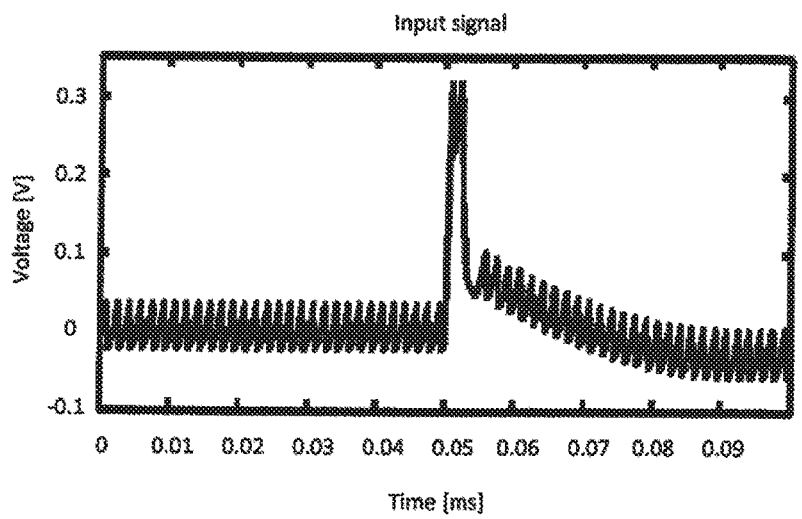
FIGS. 10A to 10C show simulations of the input signal, the estimated ripple component and the transient with attenuated ripple in a modification of the first embodiment.
Figure 10B:
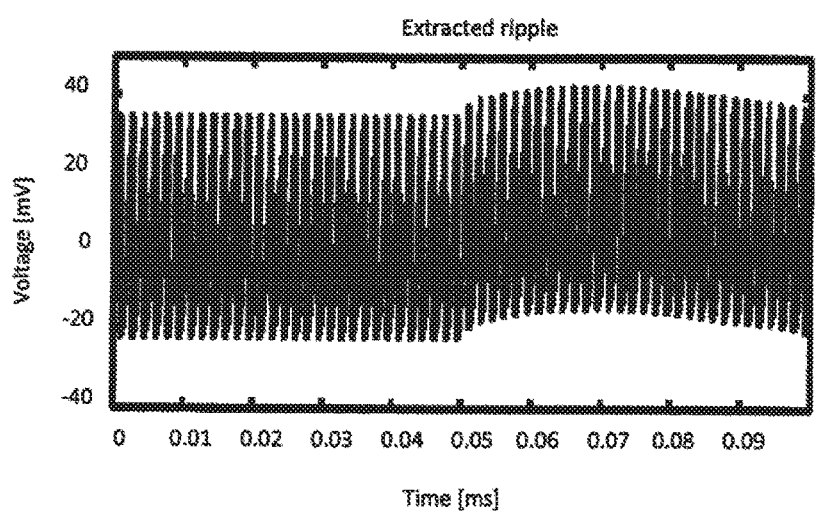
Figure 10C:
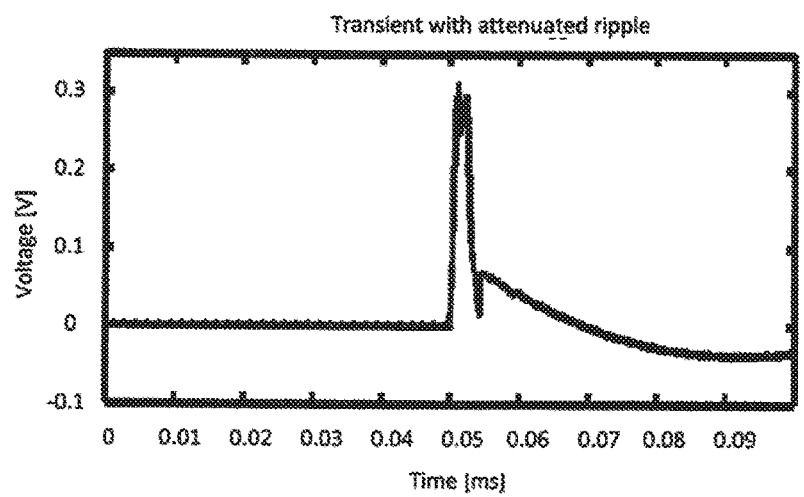

A simple improvement of the transient attenuation in the ripple extraction is to increase the factor k. Simulations with k=100 are shown in FIGS. 10A to 10C. In this variation of the first embodiment, the transient in the estimated ripple component is only a few millivolts above the normal ripple. However, the draw-back of this variation is that the filter takes a relatively long time to adjust for changes in the ripple due to, e.g. changes in the load level or the input voltage $V_{in}$. The group delay is k−1 samples for low frequencies, i.e. the pass-band of the filter. Using a corresponding interpolated FIR filter with similar attenuation as the recursive filter with k=100 would have a filter length of N×k and a group delay of Nk/2, which will be very long in many cases and require a lot of memory.

Figure 11A:
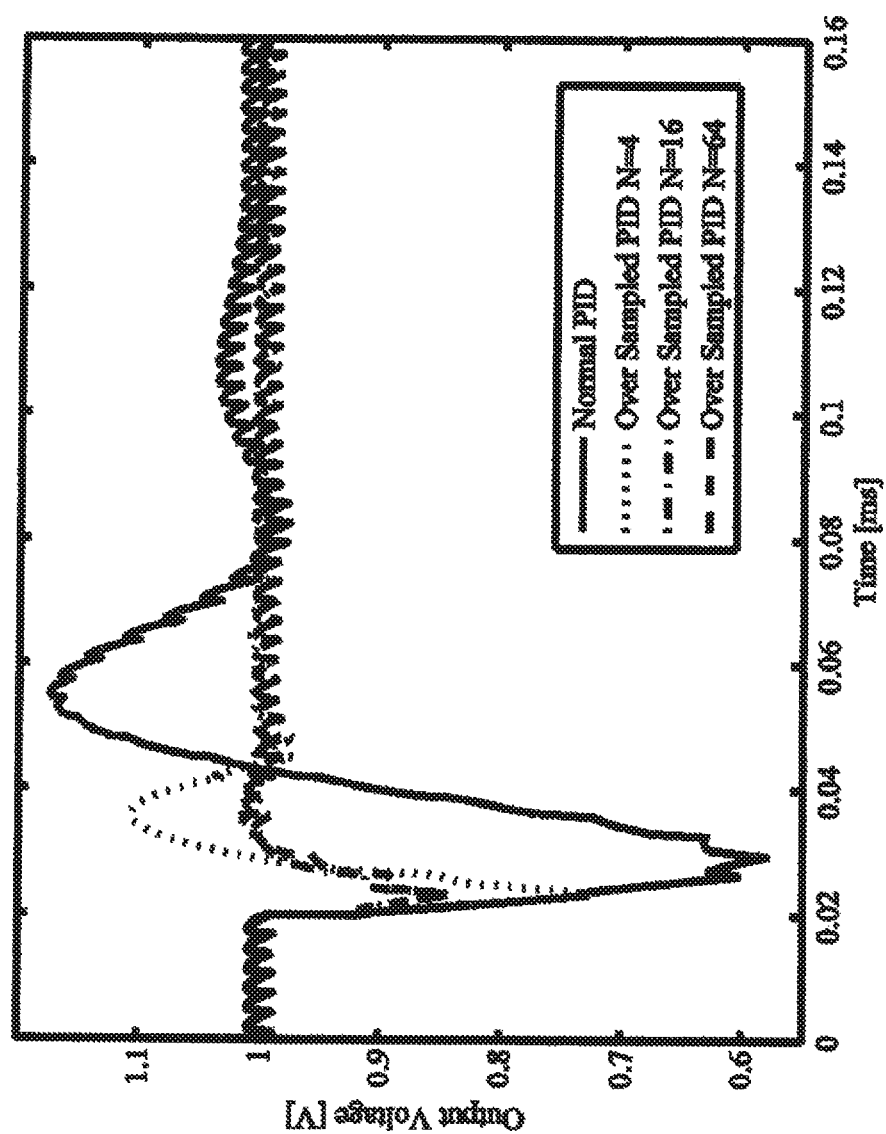
FIG. 11A shows a simulation of the response of a conventional SMPS to a load current increase and, for comparison, simulations of the response to such load increase of an SMPS according to an embodiment having the same P, I and D values but different values of the oversampling ratio N.
Figure 11B:
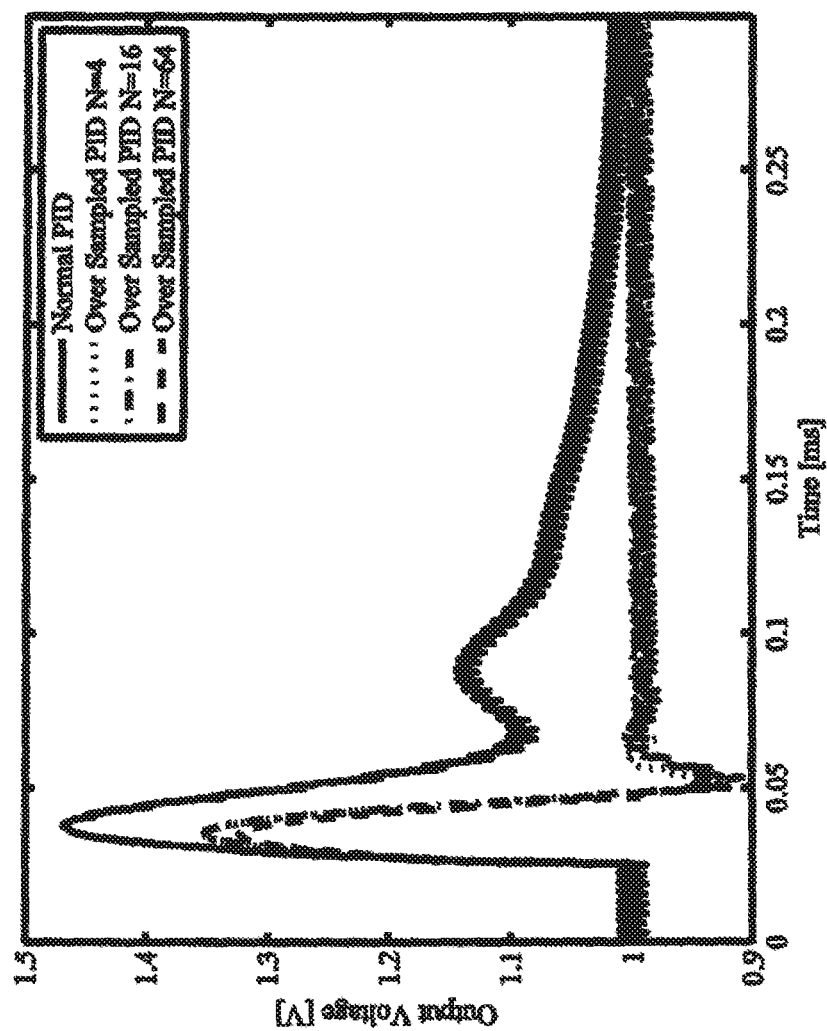
FIG. 11B shows a simulation of the response of a conventional SMPS to a load current decrease and, for comparison, simulations of the response to such load current decrease of an SMPS according to an embodiment having the same P, I and D values but different values of the oversampling ratio N.

In FIGS. 11A and 11B, a comparison is made between the performance of a conventional Nyquist-sampled PID controller and multi-rate PID controllers according to embodiments of the present invention having different oversampling ratios N. The conventional controller and the controllers of the embodiments all have identical parameters $K_p$, $K_i$ and $K_d$. The PID parameters are set for robust and high-performance behaviour during load transients for the conventional PID control. In these simulations, the input voltage is 12 V, the output voltage is 1 V, and the reference signal frequency is 320 kHz. The result is shown in FIG. 11A, where the load current increases. The conventional Nyquist-sampled PID controller has the worst performance. The multi-rate PID controller of the embodiment with an oversampling ratio of N=4 already shows an improvement, while the embodiments with N=16 and N=64 have almost identical performance. Hence, the embodiment with N=16 is near-optimal in terms of load transient performance for this particular output LC-filter bandwidth. Using a faster output filter would require a higher oversampling ratio, and would improve the load transient further. However, increasing the oversampling ratio N further would require more computation power without significantly improving the load transient response.

A simulation of a load release, i.e. an abrupt decrease in the load level, is shown in FIG. 11B. The load release is a more difficult case to control since the duty cycle cannot be less than zero. Hence, the maximum voltage peak deviations are nearly the same in all cases. However, in the simulations of the embodiments, the recovery times are greatly improved already using an oversampling ratio of N=4.

Embodiment 2

An effective approach to suppressing the appearance of the transient in the extracted ripple component is to increase the order of the filter in the ripple component estimation module 162 to two or higher. The present embodiment is based on this approach and differs from the first embodiment by the provision in the ripple component estimation module 162 of a low-pass filter in the form of a Chebychev Type 2 filter of order three, with a normalized band stop frequency of 0.1, where 1 corresponds to the Nyquist frequency and the attenuation in the stop band is 80 dB. Aside from the replacement of the first-order interpolated recursive moving average filter with the aforementioned Chebychev filter, the present embodiment is otherwise the same as the first embodiment.

Figure 12A:
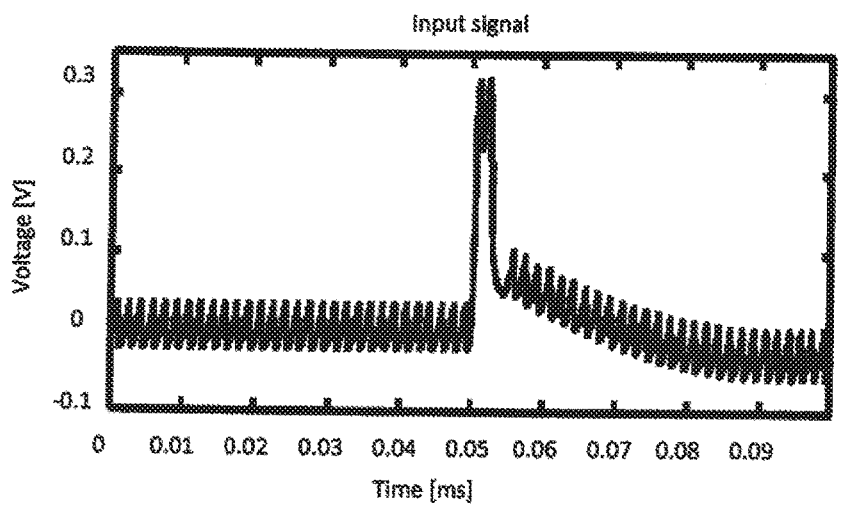
FIGS. 12A to 12C show simulations of the input signal, the estimated ripple component and the transient with attenuated ripple in a second embodiment of the present invention.
Figure 12B:
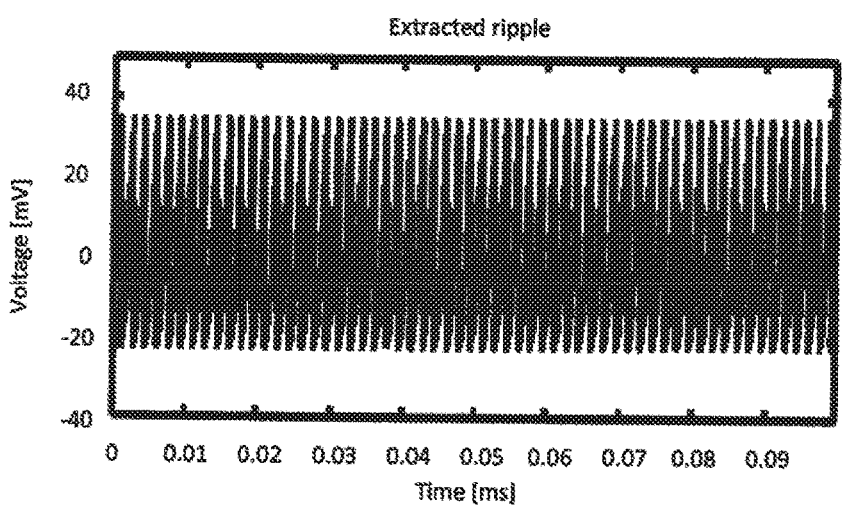
Figure 12C:
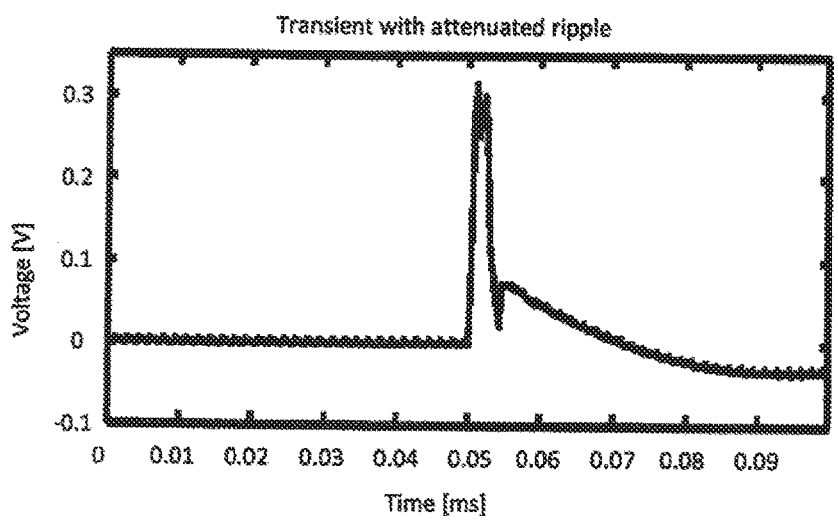

Simulation results for the second embodiment are shown in FIGS. 12A to 12C, from which it is clear that the transient in the ripple component is virtually eliminated (see FIG. 12B). By appropriate design of the higher-order filter, the latency can be reduced compared with the extremely low bandwidth first-order filter (i.e. the above-described variant of the first embodiment, where the filter has a large value of k). Using the filter of the present embodiment, the group delay in the pass band is about 80 samples. This can be reduced by increasing the stop band limit, e.g. a limit of 0.15 reduces the group delay to 55 samples, without greatly affecting the transient attenuation.

Embodiment 3

Figure 13:
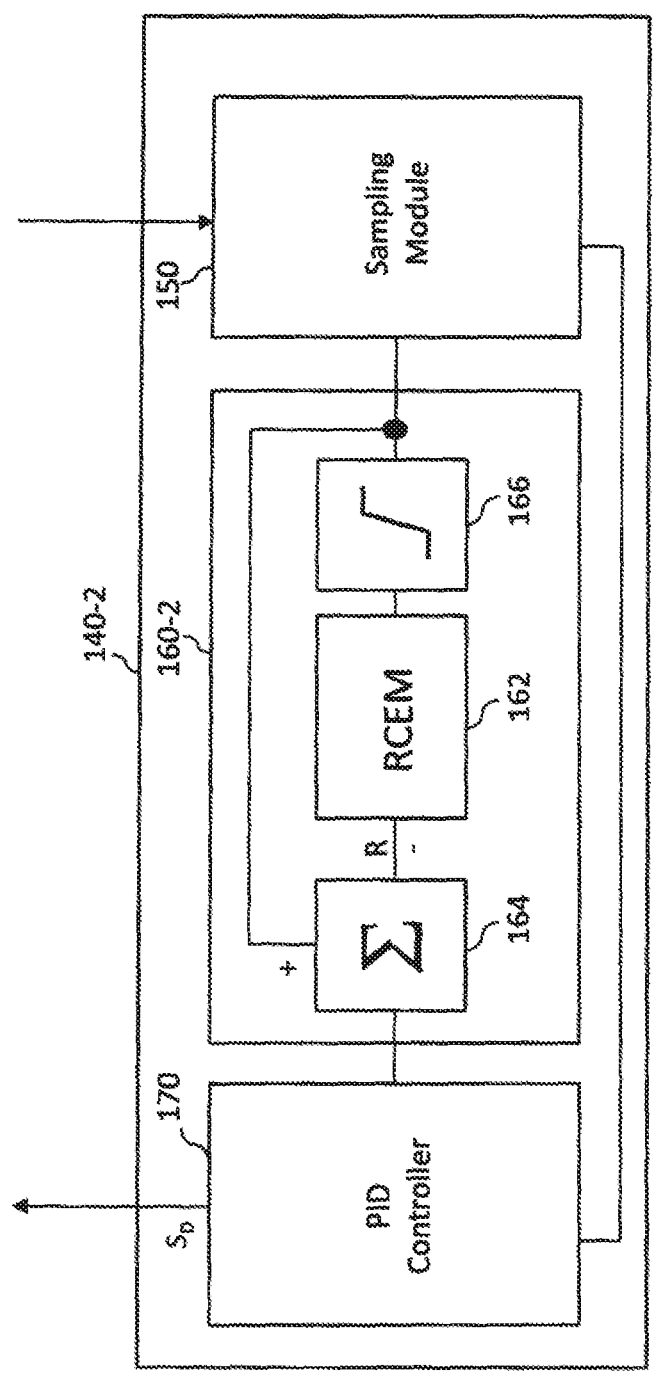
FIG. 13 shows functional components of a controller according to a third embodiment of the present invention.

Another effective but simpler approach to suppressing the appearance of the transient in the extracted ripple component is to saturate the signal input to the ripple component estimation module 160 just above the normal ripple level. The present embodiment is based on this approach and differs from the first and second embodiments by the modified filter module 160-2 of the present embodiment further comprising, as shown in FIG. 13, a clipping module 166 that is arranged to process the sampled signal by clipping the sampled signal when it exceeds a threshold level, preferably just above the normal ripple level (e.g. 2, 5 or 10% above the ripple level during stable operation of the SMPS, when no voltage transients occur). In other words, the clipping module 166 performs a signal clipping operation, allowing the signal input thereto to pass through unchanged if the amplitude of the input signal is below the threshold level, and outputting a signal at the threshold level when the input signal amplitude is at or above the threshold level. The present embodiment is otherwise the same as the first embodiment. In the present embodiment, the ripple component estimation module 162 is arranged to estimate the ripple component R by calculating, for each of a plurality of samples of the processed signal, an average of the sample value and the values of samples at corresponding points in preceding periods of the reference signal $S_{Ref}$ that have been sampled and processed. The controller of the second embodiment may be similarly modified to comprise a clipping module 166 as described above.

The operations performed by the controller 140-2 of the present embodiment are as described above with reference to FIG. 8, except that a further step is performed, between steps S10 and S20, of processing the sampled signal by clipping the sampled signal when it exceeds a threshold. In this case, the ripple component is estimated (in a modified version of step S20) by calculating, for each of the plurality of samples of the processed signal, an average of the sample value and the values of samples at corresponding points in preceding periods of $S_{Ref}$ that have been sampled and processed.

Figure 14A:
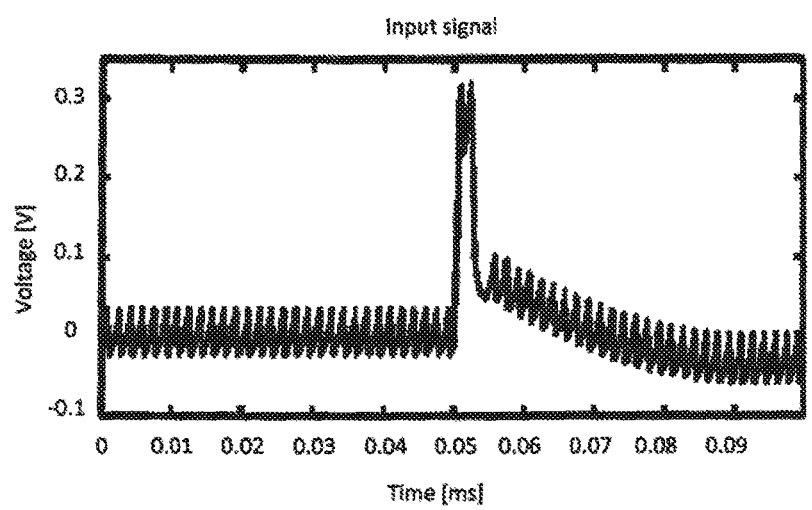
FIGS. 14A to 14C show simulations of the input signal, the estimated ripple component and the transient with attenuated ripple in the third embodiment of the present invention.
Figure 14B:
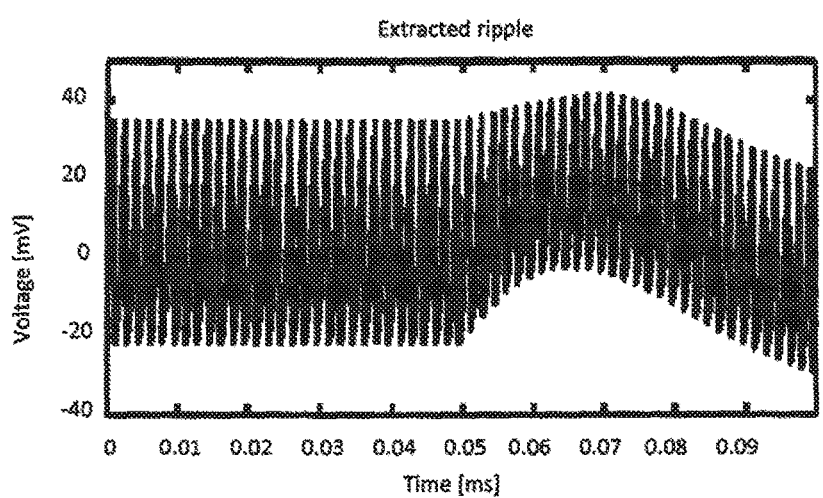
Figure 14C:
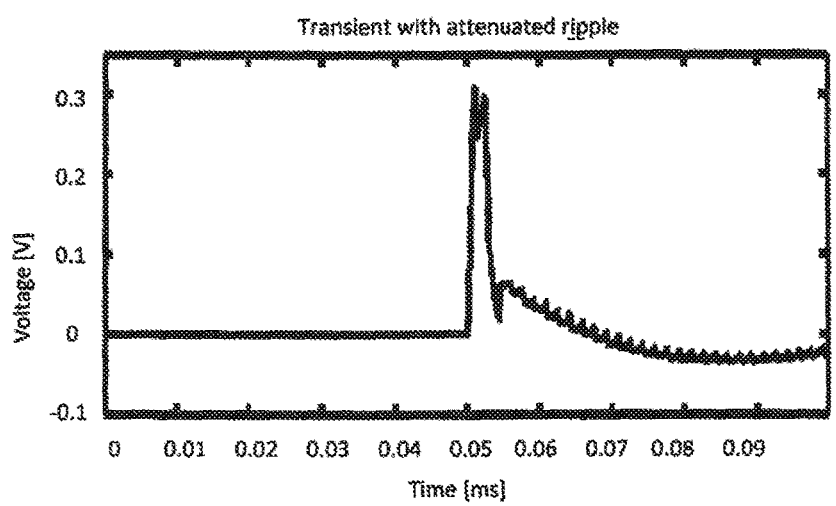

Simulation results for the third embodiment are shown in FIGS. 14A to 14C. In this simulation, the saturation limits in the clipping module 16 were set to ±50 mV. As seen in FIG. 14B, the ripple component estimate becomes a little distorted during the transient but the peak level is similar to the normal ripple. In the transient signal (FIG. 14C), the ripple shows up after the transient has occurred, due to the ripple signal having an offset.

Embodiment 4

Figure 15:
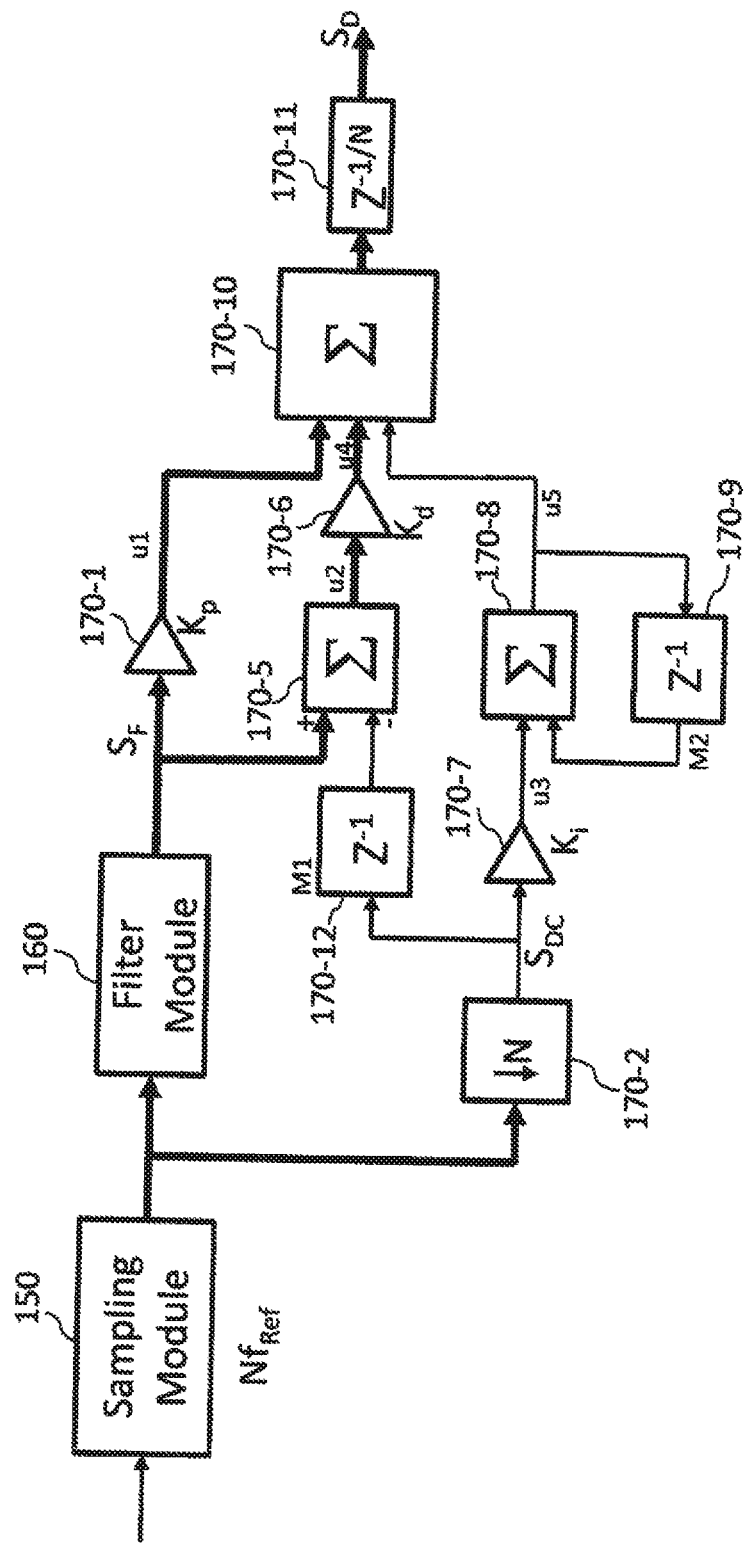
FIG. 15 is a schematic showing components of a controller according to a fourth embodiment of the present invention.

FIG. 15 shows a controller according to a fourth embodiment of the invention, which is a variant of the first embodiment. The present embodiment differs from the first embodiment by not having the block moving average filter 170-3. Instead, the down-sampling module 170-2 is arranged to generate the down-sampled signal $S_{DC}$ by sampling, at the frequency $f_{Ref}$, the signal output by the sampling module 150. In this variant, the PID controller is arranged such that use by the Derivative component of the value of the down-sampled signal $S_{DC}$ that has been stored during a period of the reference signal $S_{Ref}$ to calculate the Derivative component signal, is delayed until the following period of the reference signal $S_{Ref}$. In the variant of FIG. 15, this delay is represented by the delay element 170-12, which functions to store a received value of the signal $S_{DC}$ and make the stored value available to the difference calculating module 170-5 in the next period. On the other hand, in the first embodiment, this delay is provided by the block moving average filter 170-3. The greater simplicity of the circuit of the fourth embodiment comes at a cost of reduced DC error accuracy. However, if a significant DC error is present, it may be trimmed out by calibration, for example by adding a DC offset to the output of the down-sampling module 170-2.

The above-described modification to the first embodiment may also be made to the second and third embodiments.

Embodiment 5

As will be explained in the following, the circuit of the PID controller may be analysed using difference equations, shown in computable order with memory updates, which can be used when implementing the controller in a digital signal processor (DSP). This approach yields the following difference equations in computable order in the case of the PID controller circuit shown in FIG. 15. The ordering of some of the lines can be changed while the ordering of others cannot. For example, the computation of u3 and u5 cannot change order as the result u3 is used in the computation of u5. The computation of u1 and u2, on the other hand, can change order. In the following, only one operation is defined on each line.

$u3:=K_i \cdot S_{DC}$ $u5:=u3+M2$ for $n=1:N$ $u1:=K_P \cdot S_F[n]$ $u2:=S_F[n]-M1$ $u4:=K_d \cdot u2$ $u6:=u1+u4$ $S_D=u6+u5$ end for $M1:=S_{Dc}$ $M2:=u5$ We can rewrite the code, only explicitly calculate data that are used more than once, or needed to store to the next switch cycle. This requires u5 to be computed once, $S_D$ to be computed with every sample update of the filtered signal $S_F$, and at last the two memory updates.

$u5:=K_i \cdot S_{DC}+M2$ for $n=1:N$ $S_D=K_P \cdot S_F[n]+K_d \cdot (S_F[n]-M1)+u5$ end for $M1:=S_{DC}$ $M2:=u5$ Since $S_D$ consists of slow and fast parts, these can be computed separately, yielding a new coefficient $K_{p+d}=K_p+K_d$ which could be pre-calculated and stored in memory. Note that this may increase word lengths of the coefficients by one bit.

$u5:=K_i \cdot S_{DC}+M2$ $u7:=u5-K_d \cdot M1$ for $n=1:N$ $S_D=K_{p+d} \cdot S_F[n]+u7$ end for $M1:=S_{DC}$ $M2:=u5$ The calculation of u5 and u7 is not time-critical since they will only change once every period of the reference signal $S_{Ref}$, while $S_D$ changes N times per period. However, the first use of u7 may happen rather fast in the beginning of a new switch cycle depending on input voltage, output voltage and load current.

Figure 16:
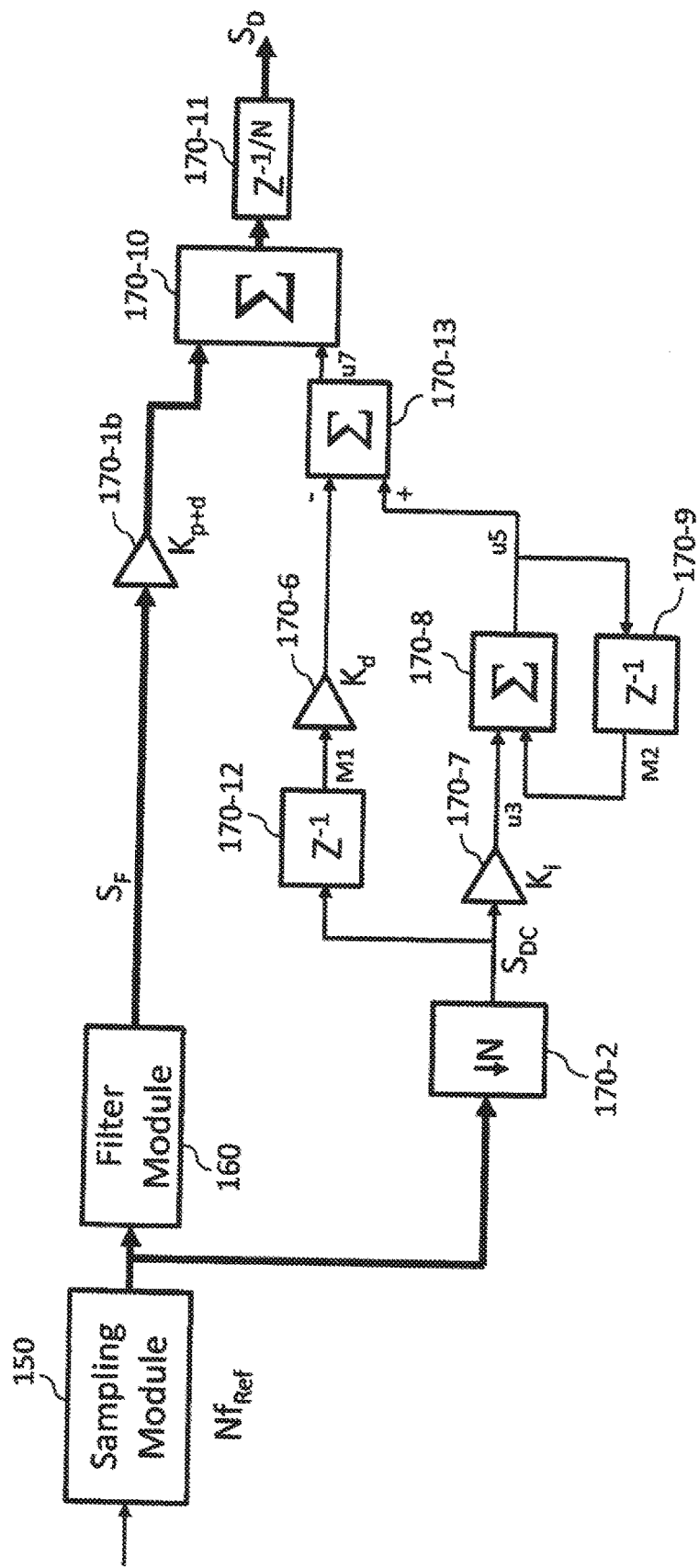
FIG. 16 is a schematic showing components of a controller according to a fifth embodiment of the present invention.

The above equations can be represented by the controller shown in FIG. 16, which constitutes a fifth embodiment of the present invention. The illustrated arrangement minimises the critical path, i.e. the path with longest computation. In FIG. 16, components that have already been described above are labelled with like reference signs. The embodiment of FIG. 16 differs from that of FIG. 15 by the illustrated reconfiguration of first and second components of the PID controller. More particularly, in the variant shown in FIG. 16, the first component is arranged to scale sample values of the filtered signal $S_F$ by a first scaling factor of $K_{p+d}=K_p+K_d$ to generate a first component signal. The second component is arranged to generate a second component signal by calculating values of a product of a second scaling factor $K_d$ and the stored value of the down-sampled signal, specifically by the scaling module 170-6 scaling the value stored in the storage module 170-12 by the factor $K_d$.

In the PID controller shown in FIG. 16, the difference calculating module 170-13 and the summing module 170-10 are arranged to function as a combining module that generates the duty cycle control signal $S_D$ by calculating the difference between the second component signal and a sum of the first and third component signals. As will be appreciated from FIG. 16, the PID controller is arranged such that each calculated value of the difference represents the difference between: (i) the sum of a respective value of the first component signal that is based on a respective one or more samples obtained by the sampling module 150 during a period of the reference signal $S_{Ref}$ and respective value of the third component signal that is based on accumulated values of the scaled, down-sampled signal that have been obtained by the down-sampling module 170-2 in preceding periods of the reference signal $S_{Ref}$; and (ii) a value of the second component signal that is based on at least one sample obtained by the sampling module 150 in the previous period of the reference signal $S_{Ref}$.

Figure 17:
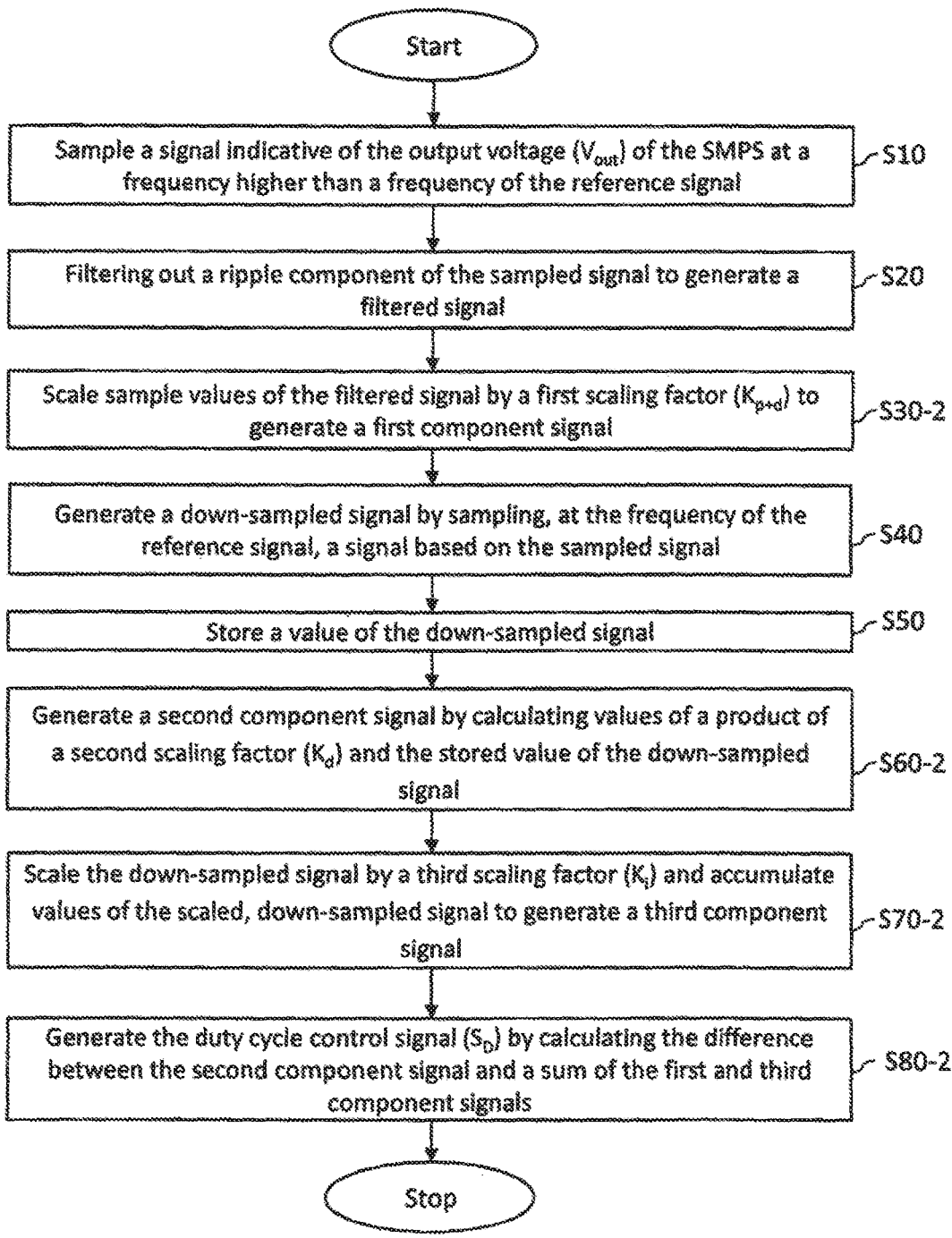
FIG. 17 is a flow diagram illustrating operations performed by the controller in the fifth embodiment to generate control signals for controlling the output voltage of the SMPS.

FIG. 17 is a flow chart illustrating operations performed by the controller 140 in the present embodiment to generate the duty cycle control signal $S_D$.

Steps S10 to S50 are the same as described above with reference to FIG. 8 although, in step S30-2 (which is a modification of step S30 in FIG. 8), the sample values of the filtered signal $S_F$ are scaled by a factor of $K_{p+d}$, rather than $K_p$.

In step S60-2, the above-described second component of the PID controller 170 generates the second component signal by calculating values of a product of the second scaling factor $K_d$ and the stored value of the down-sampled signal.

In step S70-2, the third component scales the down-sampled signal $S_{DC}$ by a third scaling factor $K_i$, and accumulates values of the scaled, down-sampled signal to generate a third component signal, as described above with reference to FIG. 8.

Finally, in step S80, the combining module (comprising the difference calculating module 170-13 and the summing module 170-10) generates the duty cycle control signal $S_D$ by calculating the difference between the second component signal and a sum of the first and third component signals, wherein each calculated value of the difference represents the difference between: (i) the sum of a respective value of the first component signal that is based on a respective one or more samples obtained during a period of the reference signal $S_{Ref}$ and respective value of the third component signal that is based on accumulated values of the scaled, down-sampled signal that have been obtained in preceding periods of the reference signal $S_{Ref}$; and (ii) a value of the second component signal that is based on at least one sample obtained in a preceding period of the reference signal $S_{Ref}$.

Embodiment 6

Figure 18:
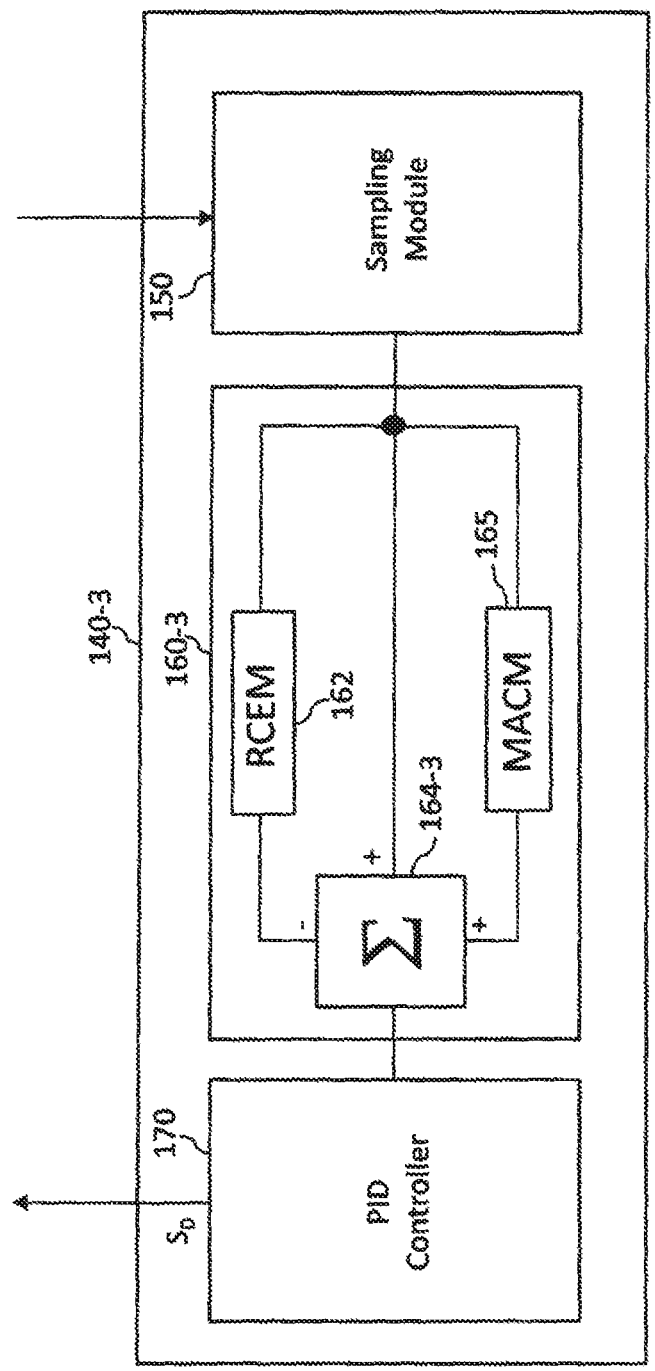
FIG. 18 is a schematic showing components of a controller according to a sixth embodiment of the present invention.

The configurations of the filter module described above allow the ripple component to be effectively suppressed whilst allowing variations in the output voltage $V_{out}$ of the SMPS to propagate to the switching control module 170, provided that those output voltage variations occur on a time scale that is not much longer than the aforementioned time window that is used by the ripple component estimation module 162 to calculate the average sample values. This is because, during operation of the SMPS 100 in the case where $V_{out}$ is essentially constant on the time scale of the averaging window, the result of subtracting the estimated ripple component from the sampled output voltage signal is substantially zero, regardless of the value of $V_{out} - V_{ref}$. In order to make the filter module more effective in suppressing slow drifts of the output voltage of the SMPS 100 from the target value, the filter module may be adapted to further comprise a moving average calculation module that is arranged to calculate a moving average of the sampled signal by calculating, for each sample of a plurality of the samples of the signal, an average (e.g. a mean) of a predetermined number of preceding sample values (e.g. in the case of the first or third embodiment, kN preceding sample values). In this variant, the subtraction module would be arranged to generate the filtered signal by subtracting the estimated ripple component from a sum of the sampled signal and the calculated moving average. A controller 140-3 according to such a variant is illustrated in FIG. 18, where the modified filter module 160-3 comprises a RCEM 162 as in the first embodiment, as well as a moving average calculation module (MACM) 165 and a modified subtraction module 164-3. The MACM 165 effectively suppresses any DC output voltage error/offset that might be introduced into the system (e.g. at start-up of the SMPS 100). In this fifth embodiment, the process described above with reference to FIG. 8 would be modified by inclusion of an additional step (performed either between steps S10 and S20 or between steps S20 and S30, or in parallel with step S20) of calculating a moving average of the sampled signal by calculating, for each sample of a plurality of the samples of the signal, an average of a predetermined number of preceding sample value. The filtered signal would then be generated by subtracting the estimated ripple component from a sum of the sampled signal and the calculated moving average in a modified version of step S30.

Figure 19:
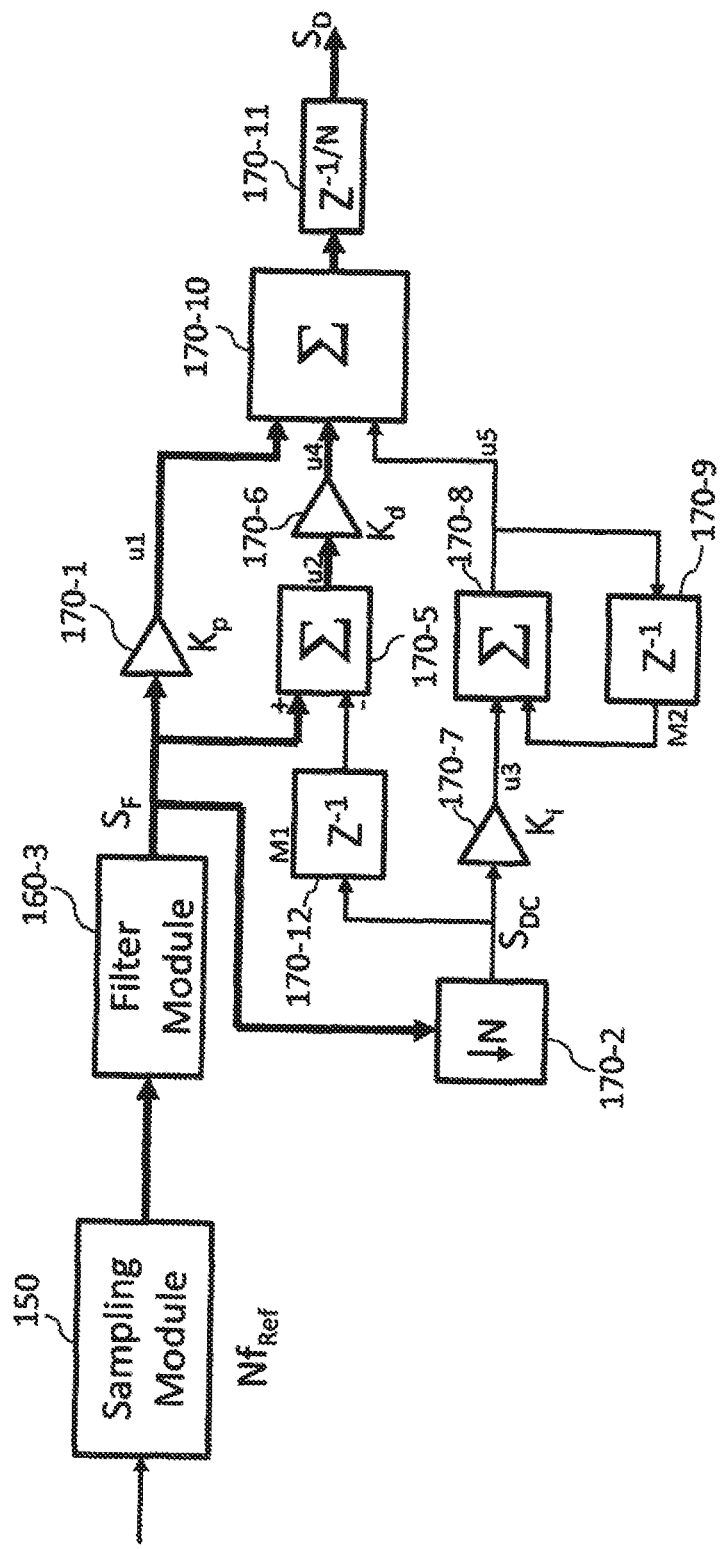
FIG. 19 is a schematic showing further details of the controller 140-3 of the sixth embodiment.

Further details of the controller of the sixth embodiment are shown in FIG. 19. The controller of the sixth embodiment is a variant of the controller of the fourth embodiment described above with reference to FIG. 15, and has the filter module 160-3 shown in FIG. 18 in place of the filter module 160 of the fourth embodiment, and is arranged such that the down-sampling module 170-2 generates the down-sampled signal $S_{DC}$ by sampling, at $f_{Ref}$, the filtered signal $S_F$ (rather than the signal from the sampling module 150 before it has been filtered by the filter module 160-3), and such that use by the second component of the value of the down-sampled signal that has been stored in the delay element 170-12 during a period of the reference signal, to calculate the second component signal, is delayed until the following period of the reference signal.

Figure 20:
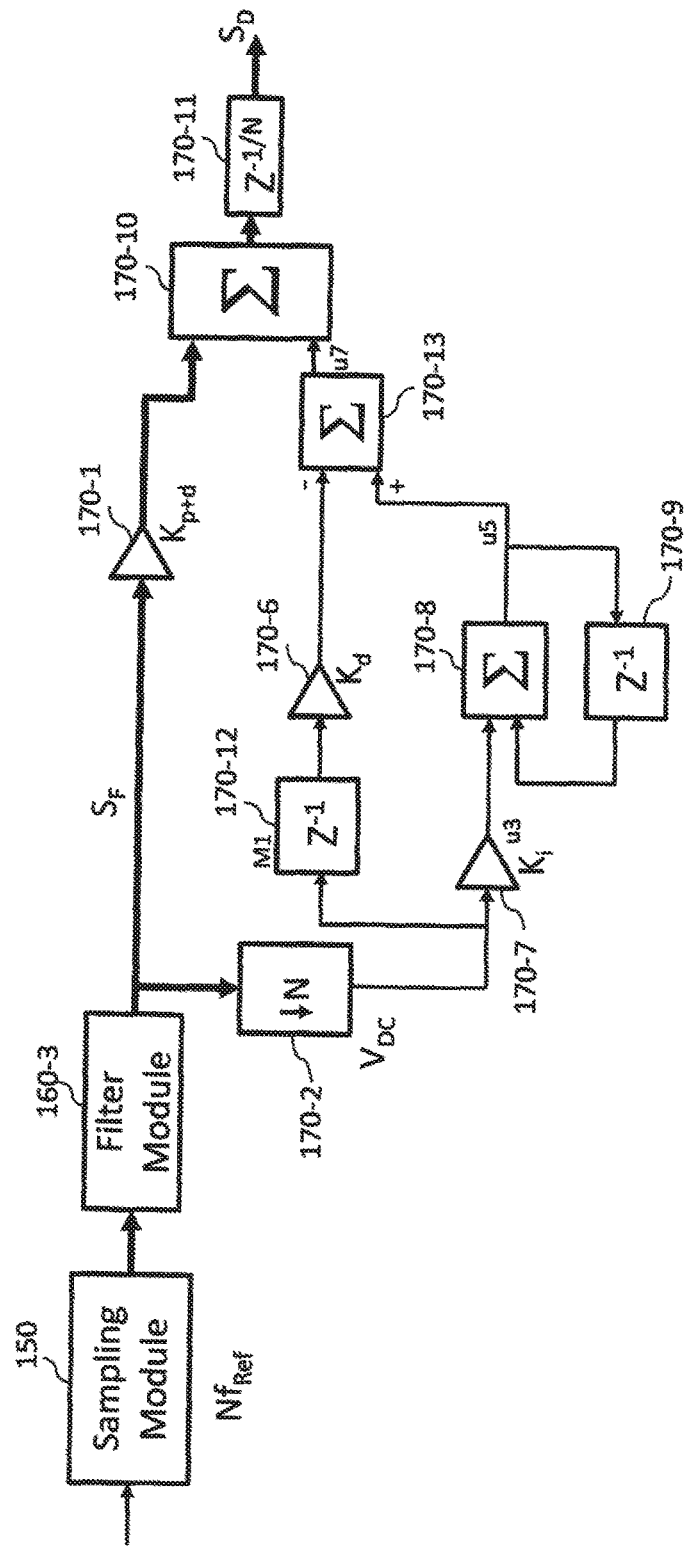
FIG. 20 is a schematic showing components of a controller according to variant of the sixth embodiment.

The sixth embodiment may be modified in the same way as described above with reference to FIG. 16. The correspondingly modified controller circuit is shown in FIG. 20, where circuit elements that have already been described are labelled with like reference signs.

[Modifications and Variations]

Many modifications and variations can be made to the embodiments described above.

For example, the ordering of steps S20 to S70 in FIG. 8 may differ from that illustrated. For instance, the processes in steps S20 and S30 may be performed after, or in parallel with, steps S40 to S60. The process illustrated in FIG. 17 may be modified in a similar way.

As another possible modification, in the above-described embodiments, the subtraction module 130 could be replaced by a module at the output of the sampling module 150 (or an operation done by the sampling module itself), which shifts each sample value by a value representative of a target voltage, in order to digitally generate the error signal.

Furthermore, the above-described Chebychev Type-2 filter is only an example of a higher-order filter that is optimized to yield a flat response in the pass-band and equal ripple in the stop-band. Other optimizations, such as Butterworth, Chebychev Type-1, elliptic, or even Bessel could alternatively be used. Another possibility would be a filter optimized for minimizing the number of 1's, which would simplify hardware requirements for the multiplications.

Furthermore, although the controller of the above embodiments is configured to suppress a ripple component of the feedback signal at the frequency of the reference signal $S_{Ref}$, the controller may alternatively or additionally have one or more parallel modules arranged to suppress a ripple component of the feedback signal at one or more harmonics of the fundamental frequency of the ripple component. In these embodiments, the sampling frequency could, for example, be set to $N \times 2f_{Ref}$ to eliminate the second harmonic, $N \times 3f_{Ref}$ to eliminate the third harmonic, etc.

Furthermore, the filter module of the above-described embodiments need not perform its averaging calculations using sample values located at corresponding points in consecutive periods of the ripple component to be filtered out. Thus, adjacent corresponding points considered in the estimation may alternatively be separated from each other by an integer number of ripple periods that is greater than one.

As another modification, the oversampling factor N does not need to be an integer. If, for example, N was set to 16.5, the received signal would be sampled at corresponding points every two periods of the reference signal. The filter module 160, 160-2 or 160-3 would in that case estimate an average sample value by using sample values which are separated from the sample by an even integer number of switching periods (i.e. multiple of 2).

The invention claimed is:

1. A controller arranged to generate a duty cycle control signal for regulating an output voltage of a switched mode power supply, comprising:
    a sampling module arranged to sample a signal indicative of the output voltage at a frequency higher than a frequency of an oscillatory reference signal to produce a sampled signal;
    a filter module arranged to filter out a ripple component from the sampled signal to generate a filtered signal; and
    a proportional-integral-derivative (PID) controller arranged to generate the duty cycle control signal based on the filtered signal, comprising:
        a first component arranged to scale sample values of the filtered signal by a first scaling factor to generate a first component signal;

a down-sampling module arranged to sample a signal based on the sampled signal at the frequency of the oscillatory reference signal to generate a down-sampled signal;

a storage module arranged to store a value of the down-sampled signal;

a second component arranged to calculate values of a product of a second scaling factor and a difference signal between each sample value of the filtered signal and a stored value of the down-sampled signal to generate a second component signal;

a third component arranged to scale the down-sampled signal by a third scaling factor and accumulate values of a scaled, down-sampled signal to generate a third component signal; and a summing module arranged to generate the duty cycle control signal as a function of the first, second and third component signals.

2. The controller as recited in claim 1, further comprising a block moving average filter arranged to calculate a respective average of samples obtained by the sampling module in each period of the oscillatory reference signal, the down-sampling module being arranged to generate the down-sampled signal by sampling, at the frequency of the oscillatory reference signal, a moving average calculated by the block moving average filter.

3. The controller as recited in claim 1, wherein the second component is arranged to delay the stored value of the down-sampled signal until a period following the oscillatory reference signal to generate the second component signal.

4. The controller as recited in claim 1, wherein:
the filter module, comprises:
a ripple component estimation module arranged to estimate the ripple component by calculating, for each sample of a plurality of the sampled signals separated by an integer number of periods of the oscillatory reference signal, an average sample value using the sampled signal and sample values obtained at corresponding points in preceding periods of the oscillatory reference signal;
a moving average calculation module arranged to calculate a moving average of the sampled signal by calculating, for each sample of the plurality of the sampled signals, an average of a predetermined number of preceding sample values; and
a subtraction module arranged to generate the filtered signal by calculating a difference between an estimated ripple component and a sum of the sampled signal and a calculated moving average; and
the second component is arranged to delay the stored value of the down-sampled signal until a period following the oscillatory reference signal to generate the second component signal.

5. The controller as recited in claim 1, wherein the filter module, comprises:
a ripple component estimation module arranged to estimate the ripple component by calculating, for each sample of a plurality of the sampled signals separated by an integer number of periods of the oscillatory reference signal, an average sample value using the sampled signal and sample values obtained at corresponding points in preceding periods of the oscillatory reference signal; and
a subtraction module arranged to generate the filtered signal by calculating a difference between an estimated ripple component and the sampled signal.

6. The controller as recited in claim 5, wherein the sampling module is arranged to sample the signal indicative of the output voltage at a frequency $N \cdot f_{Ref}$, where N is an integer and $f_{Ref}$ is the frequency of the oscillatory reference signal, and the ripple component estimation module includes an interpolated recursive moving average filter, comprising:
a first scaling module arranged to receive sample values of the sampled signal and scale each of the sample values by a factor $1/k$, where k is an integer indicative of a number of periods of the oscillatory reference signal in calculating the average sample value performed by the ripple component estimation module;
a second summing module arranged to add each of the scaled sample values to a respective sum of the scaled sample values to generate respective addition results; and
a feedback loop comprising:
a delay module arranged to receive the addition results, store N of the addition results at a time, and output a stored addition result when an addition result is received by the delay module; and
a second scaling module arranged to receive the addition results from the delay module and scale each addition result by a factor $1-1/k$ to generate a respective sum of the scaled sample values that is to be added to a respective scaled sample value by the second summing module.

7. The controller as recited in claim 5, wherein the filter module further comprises a clipping module arranged to clip the sampled signal when exceeding a threshold.

8. A method for generating a duty cycle control signal for regulating an output voltage of a switched mode power supply, comprising:
sampling a signal indicative of the output voltage at a frequency higher than a frequency of an oscillatory reference signal to produce a sampled signal;
filtering out a ripple component from the sampled signal to generate a filtered signal; and
generating the duty cycle control signal based on the filtered signal, comprising:
scaling sample values of the filtered signal by a first scaling factor to generate a first component signal;
sampling a signal based on the sampled signal at the frequency of the oscillatory reference signal to generate a down-sampled signal;
storing a value of the down-sampled signal;
calculating values of a product of a second scaling factor and a difference signal between each sample value of the filtered signal and a stored value of the down-sampled signal to generate a second component signal;
scaling the down-sampled signal by a third scaling factor and accumulating values of a scaled, down-sampled signal to generate a third component signal; and
generating the duty cycle control signal as a function of the first, second and third component signals.

9. The method as recited in claim 8, wherein:
filtering out the ripple component, comprises:
estimating the ripple component by calculating, for each sample of a plurality of the sampled signals separated by an integer number of periods of the oscillatory reference signal, an average sample value using the sampled signal and sample values obtained at corresponding points in preceding periods of the oscillatory reference signal;

calculating a moving average of the sampled signal by calculating, for each sample of the plurality of the sampled signals, an average of a predetermined number of preceding sample values; and generating the filtered signal by calculating a difference between an estimated ripple component and a sum of the sampled signal and a calculated moving average; and generating the second component signal comprises delaying the stored value of the down-sampled signal until a period following the oscillatory reference signal.

10. The method as recited in claim 8, wherein filtering out the ripple component, comprises:

estimating the ripple component by calculating, for each sample of a plurality of the sampled signals separated by an integer number of periods of the oscillatory reference signal, an average sample value using the sampled signal and sample values obtained at corresponding points in preceding periods of the oscillatory reference signal; and generating the filtered signal by calculating a difference between an estimated ripple component and the sampled signal.

11. A controller arranged to generate a duty cycle control signal for regulating an output voltage of a switched mode power supply, comprising:

a sampling module arranged to sample a signal indicative of the output voltage at a frequency higher than a frequency of an oscillatory reference signal to produce a sampled signal;

a filter module arranged to filter out a ripple component from the sampled signal to generate a filtered signal; and a proportional-integral-derivative (PID) controller arranged to generate the duty cycle control signal based on the filtered signal, comprising:

a first component arranged to scale sample values of the filtered signal by a first scaling factor to generate a first component signal;

a down-sampling module arranged to sample a signal based on the sampled signal at the frequency of the oscillatory reference signal to generate a down-sampled signal;

a storage module arranged to store a value of the down-sampled signal;

a second component arranged to calculate values of a product of a second scaling factor and a stored value of the down-sampled signal to generate a second component signal;

a third component arranged to scale the down-sampled signal by a third scaling factor and accumulate values of a scaled, down-sampled signal to generate a third component signal; and a combining module arranged to generate the duty cycle control signal by calculating a difference between the second component signal and a sum of the first and third component signals and the PID controller is arranged such that each calculated value of the difference represents the difference between:

(i) a sum of a respective value of the first component signal that is based on a respective one or more samples obtained by the sampling module during a period of the oscillatory reference signal, and a respective value of the third component signal that is based on accumulated values of the scaled, down-sampled signal obtained by the down-sampling module in preceding periods of the oscillatory reference signal; and (ii) a value of the second component signal that is based on at least one sample obtained by the sampling module in a preceding period of the oscillatory reference signal.

12. The controller as recited in claim 11, further comprising a block moving average filter arranged to calculate a respective average of samples obtained by the sampling module in each period of the oscillatory reference signal, the down-sampling module being arranged to generate the down-sampled signal by sampling, at the frequency of the oscillatory reference signal, a moving average calculated by the block moving average filter.

13. The controller as recited in claim 11, wherein the second component is arranged to delay the stored value of the down-sampled signal until a period following the oscillatory reference signal to generate the second component signal.

14. The controller as recited in claim 11, wherein:

the filter module, comprises:

a ripple component estimation module arranged to estimate the ripple component by calculating, for each sample of a plurality of the sampled signals separated by an integer number of periods of the oscillatory reference signal, an average sample value using the sampled signal and sample values obtained at corresponding points in preceding periods of the oscillatory reference signal;

a moving average calculation module arranged to calculate a moving average of the sampled signal by calculating, for each sample of the plurality of the sampled signals, an average of a predetermined number of preceding sample values; and a subtraction module arranged to generate the filtered signal by calculating a difference between an estimated ripple component and a sum of the sampled signal and a calculated moving average; and the second component is arranged to delay the stored value of the down-sampled signal until a period following the oscillatory reference signal to generate the second component signal.

15. The controller as recited in claim 11, wherein the filter module, comprises:

a ripple component estimation module arranged to estimate the ripple component by calculating, for each sample of a plurality of the sampled signals separated by an integer number of periods of the oscillatory reference signal, an average sample value using the sampled signal and sample values obtained at corresponding points in preceding periods of the oscillatory reference signal; and a subtraction module arranged to generate the filtered signal by calculating a difference between an estimated ripple component and the sampled signal.

16. The controller as recited in claim 15, wherein the sampling module is arranged to sample the signal indicative of the output voltage at a frequency $N \cdot f_{Ref}$, where N is an integer and $f_{Ref}$ is the frequency of the oscillatory reference signal, and the ripple component estimation module includes an interpolated recursive moving average filter, comprising:

a first scaling module arranged to receive sample values of the sampled signal and scale each of the sample values by a factor $1/k$, where k is an integer indicative of a number of periods of the oscillatory reference signal in calculating the average sample value performed by the ripple component estimation module;

a second summing module arranged to add each of the scaled sample values to a respective sum of the scaled sample values to generate respective addition results; and a feedback loop comprising:
   a delay module arranged to receive the addition results, store N of the addition results at a time, and output a stored addition result when an addition result is received by the delay module; and
   a second scaling module arranged to receive the addition results from the delay module and scale each addition result by a factor 1-1/k to generate a respective sum of the scaled sample values that is to be added to a respective scaled sample value by the second summing module.

17. The controller as recited in claim 15, wherein the filter module further comprises a clipping module arranged to clip the sampled signal when exceeding a threshold.

18. A method for generating a duty cycle control signal for regulating an output voltage of a switched mode power supply, comprising:
   sampling a signal indicative of the output voltage at a frequency higher than a frequency of an oscillatory reference signal to produce a sampled signal;
   filtering out a ripple component from the sampled signal to generate a filtered signal; and
   generating the duty cycle control signal based on the filtered signal, comprising:
      scaling sample values of the filtered signal by a first scaling factor to generate a first component signal;
      sampling a signal based on the sampled signal at the frequency of the oscillatory reference signal to generate a down-sampled signal;
      storing a value of the down-sampled signal;
      calculating values of a product of a second scaling factor and a stored value of the down-sampled signal to generate a second component signal;
      scaling the down-sampled signal by a third scaling factor and accumulating values of a scaled, down-sampled signal to generate a third component signal; and
      generating the duty cycle control signal by calculating a difference between the second component signal and a sum of the first and third component signals, each calculated value of the difference represents the difference between:
         (i) a sum of a respective value of the first component signal that is based on a respective one or more samples obtained to produce the sampled signal during a period of the oscillatory reference signal, and a respective value of the third component signal that is based on accumulated values of the scaled, down-sampled signal obtained to generate the down-sampled signal in preceding periods of the oscillatory reference signal; and
         (ii) a value of the second component signal that is based on at least one sample obtained to produce the sampled signal in a preceding period of the oscillatory reference signal.

19. The method as recited in claim 18, wherein:
filtering out the ripple component, comprises:
   estimating the ripple component by calculating, for each sample of a plurality of the sampled signals separated by an integer number of periods of the oscillatory reference signal, an average sample value using the sampled signal and sample values obtained at corresponding points in preceding periods of the oscillatory reference signal;
   calculating a moving average of the sampled signal by calculating, for each sample of the plurality of the sampled signals, an average of a predetermined number of preceding sample values; and
   generating the filtered signal by calculating a difference between an estimated ripple component and a sum of the sampled signal and a calculated moving average; and
generating the second component signal comprises delaying the stored value of the down-sampled signal until a period following the oscillatory reference signal.

20. The method as recited in claim 18, wherein filtering out the ripple component, comprises:
   estimating the ripple component by calculating, for each sample of a plurality of the sampled signals separated by an integer number of periods of the oscillatory reference signal, an average sample value using the sampled signal and sample values obtained at corresponding points in preceding periods of the oscillatory reference signal; and
   generating the filtered signal by calculating a difference between an estimated ripple component and the sampled signal.

* * * * *